United States Patent [19]
Williams et al.

[11] Patent Number: 5,787,206
[45] Date of Patent: Jul. 28, 1998

[54] METHOD AND SYSTEM FOR PROCESSING IMAGE INFORMATION USING EXPANDED DYNAMIC SCREENING AND ERROR DIFFUSION

[75] Inventors: Leon C. Williams, Walworth; Jeng-Nan Shiau, Webster; David J. Metcalfe, Marion, all of N.Y.

[73] Assignee: Xerox Corporation, Stamford, Conn.

[21] Appl. No.: 655,422

[22] Filed: May 30, 1996

[51] Int. Cl.$^6$ .................................................. H04N 1/405
[52] U.S. Cl. .......................... 382/237; 382/252; 358/456
[58] Field of Search ........................ 382/237, 252, 382/270; 358/456, 457, 458, 466, 298, 534, 535, 536; 395/109

[56] References Cited

U.S. PATENT DOCUMENTS

| | | | |
|---|---|---|---|
| 4,829,587 | 5/1989 | Glazer et al. | 382/299 |
| 5,068,484 | 2/1992 | Katayama et al. | 358/465 |
| 5,121,447 | 6/1992 | Tanioka et al. | 382/252 |
| 5,208,871 | 5/1993 | Eschbach | 382/252 |
| 5,258,854 | 11/1993 | Eschbach | 358/455 |
| 5,271,070 | 12/1993 | Truong et al. | 382/252 |
| 5,274,472 | 12/1993 | Williams | 358/455 |
| 5,317,653 | 5/1994 | Eschbach et al. | 382/252 |
| 5,327,256 | 7/1994 | Kang et al. | 382/299 |
| 5,410,615 | 4/1995 | Mailloux | 382/299 |
| 5,442,461 | 8/1995 | Levien | 358/456 |
| 5,528,384 | 6/1996 | Metcalfe et al. | 358/456 |
| 5,535,019 | 7/1996 | Eschbach | 358/456 |
| 5,608,821 | 3/1997 | Metcalfe et al. | 382/252 |
| 5,655,061 | 8/1997 | Tse et al. | 358/456 |
| 5,696,601 | 12/1997 | Metcalfe et al. | 382/252 |

OTHER PUBLICATIONS

A Survey of Electronic Techniques for Pictorial Reproduction by J.C. Stoffel and J.F. Moreland IEEE Transactions on Communications, vol. COM-29, No. 12, Dec. 1981, pp. 1898–1925.

*Primary Examiner*—Scott Rogers
*Attorney, Agent, or Firm*—Michael J. Nickerson

[57] ABSTRACT

A printing system for rendering marks on a recording medium receives a multi-level grey scale pixel value representing a pixel having a first resolution. A screening circuit generates a screened multi-level grey scale pixel value equal to $(G_L-V_i)+(S_i-Th)*Dmp_{vi}*Mod_{Eff}$ wherein $G_L$ is the maximum grey level value of the pixel, $V_i$ is equal to the multi-level grey scale pixel value of the first resolution, $S_i$ is equal to a screen value corresponding to a position of the pixel, Th is the threshold value, $Dmp_{vi}$ is a video dependent dampening factor, and $Mod_{Eff}$ is a modulation multiplication factor. An interpolator converts the screened multi-level grey scale pixel value to a second resolution, the second resolution being higher than the first resolution, and a binarization circuit binarizes the converted multi-level grey scale pixel value so as to output a binary signal and an error value, the error value having a resolution equal to the first resolution. The error value is diffused to multi-level grey scale pixel values corresponding to pixels adjacent to the pixel having the first resolution, and the binary signal is converted into a mark on the recording medium.

17 Claims, 27 Drawing Sheets

$$\text{Desired Output} = \frac{P0_i + P1_i}{2}$$

$$\text{Actual Output} = \frac{n*255}{N}$$

| 64 | 192 | 128 | 64 | 192 | 128 | 64 | 192 | 128 |
|---|---|---|---|---|---|---|---|---|
| 64 | 192 | 128 | 64 | 192 | 128 | 64 | 192 | 128 |
| 64 | 192 | 128 | 64 | 192 | 128 | 64 | 192 | 128 |
| 64 | 192 | 128 | 64 | 192 | 128 | 64 | 192 | 128 |

| 64 | 192 | 128 | 64 | 192 | 128 | 64 |
|---|---|---|---|---|---|---|
| 128 | 64 | 192 | 128 | 64 | 192 | 128 |
| 192 | 128 | 64 | 192 | 128 | 64 | 192 |
| 64 | 192 | 128 | 64 | 192 | 128 | 64 |

| 191 | 218 | 191 | 65 | 38 | 65 |
| --- | --- | --- | --- | --- | --- |
| 218 | 255 | 218 | 38 | 1 | 38 |
| 191 | 218 | 191 | 65 | 38 | 65 |

METHOD AND SYSTEM FOR PROCESSING IMAGE INFORMATION USING EXPANDED DYNAMIC SCREENING AND ERROR DIFFUSION

FIELD OF THE PRESENT INVENTION

The present invention relates to the conversion of images from multi-level grey scale pixel values to a reduced number of levels pixel values. More specifically, the present invention relates to the conversion of multi-level grey scale pixel values to a reduced number of levels pixel values using a combined expanded dynamic screening and error diffusion technique.

BACKGROUND OF THE PRESENT INVENTION

Image information, be it color or black and white, is commonly derived by scanning, initially at least, in a grey level format containing a large number of levels, e.g.: 256 levels for black and white and more than 16 million ($256^3$) levels for color. This multi-level format is usually unprintable by standard printers.

The term "grey level" is used to described such data for both black and white and color applications. Standard printers print in a limited number of levels, either a spot or a no spot in the binary case, or a limited number of levels associated with the spot, for example, four in the quaternary case. Since grey level image data may be represented by very large values, it is necessary to reduce grey level image data to a limited number of levels so that it is printable. Besides grey level image information derived by scanning, certain processing techniques, such as computer generation, produce grey level pixel values which require such a conversion.

One standard method of converting grey level pixel image data to binary level pixel image data is through the use of screening, dithering, or halftoning. In such arrangements, over a given area, each grey level pixel within the area is compared to one of a set of distinct preselected thresholds. The set of thresholds comprises a matrix of threshold values or a halftone cell.

FIG. 30 illustrates a block diagram of a typical screening circuit. In this circuit, an unmodified image or video signal is fed into a modulation circuit 1 with a screen value from a halftone screen matrix to produce a modified signal. The modified signal is then thresholded by a binarization circuit 3 to produce a binary output. The binary output represents either the ON or OFF characteristic of the processed pixel. It is noted that the screen could be developed so as to replace the threshold value such that the threshold value would change from pixel to pixel and the system would not require the adding of the screen value before thresholding. These are equivalent systems.

The conversion from the pixel video signal V to the screen modulated signal $V_s'$ is depicted in FIG. 32. For a fixed video signal V, the screen modulated video signal $V_s'$ has values varying between the levels A and B as the screen value S vary between 255 and 0. Thus, the effective white and black values to be used in the binarization process or calculation should be, in this example, for the value of white, 0 and, for the value of black, 255.

In the described process, the sampled image picture elements are compared with a single threshold, and a black/white decision is made. However, the threshold relationship is modified by modulating the image data with the screen data. The screen data is selected in sequential order from a two-dimensional matrix defined as a halftone cell threshold set. The set of screen values and the arrangement therein determine the grey scale range, frequency, angle, and other properties of the halftone pictorial image.

The effect of such an arrangement is that, for an area where the image is grey, some of the thresholds within the matrix will be exceeded, while others are not. In the binary case, the portions of the matrix, or cell elements, in which the thresholds are exceeded are printed as white, while the remaining elements are allowed to remain black or vice-versa depending on the orientation of the system, (write white system or write black system). For example, 255 may represent white in one system, (write white), but black in another system, (write black). The effect of the distribution of black and white over the cell is integrated by the human eye as grey.

However, typical screening presents problems in that the amount of grey within an original image is not maintained exactly over an area because the finite number of elements inside each halftone cell only allows the reproduction of a finite number of grey levels. The error arising from the difference between the threshold value and the actual grey level value at any particular cell is, conventionally, thrown away. This results in loss of image information and creates significant image artifacts, such as banding or false contours that can be seen in smooth image areas. In banding, the image input grey level varies smoothly over an area while the halftoned image has to make a transition from one halftone dot (grey level) to another. This transition can clearly be seen as a band or contour running through smooth image parts.

Another problem associated with screening grey images is the trade-off between the screen frequency and the number of grey levels available. Although it is desirable to use a high frequency screen, the number of grey levels available decreases as the screen frequency increases. One method which has been proposed to increase the number of grey levels as the screen frequency increases is set forth in U.S. Pat. No. 5,317,653 to Eschbach et al. The entire contents of U.S. Pat. No. 5,317,653 are hereby incorporated by reference.

In this method, the grey image is first reduced to a small number of grey levels with error diffusion, and then a line screen with a small number of grey levels and a high frequency is used. Any errors from the screening process are discarded. This two step process binarizes the image.

FIG. 22 illustrates a conventional error diffusion technique. In Step S1 of this process, the video signal for pixel X is modified to include the accumulated error diffused to this pixel from previous threshold processes. The modified video signal value X is compared at Step S2 with the value 128, assuming a video range between 0 and 255. If Step S2 determines that the modified video signal value X is greater than or equal to 128, the process proceeds to Step S4 wherein a value is output to indicate the turning ON of pixel X. The process then proceeds to calculate the error associated with the threshold process at Step S6 wherein this error, Y, is calculate as being X−255.

On the other hand, if Step S2 determines that the modified video signal value X is less than 128, a signal is output at Step S3 indicating that the pixel X is to be turned OFF. The process then proceeds to Step S5 wherein the error, Y, is calculated as being equal to the value X.

The error calculated in either Steps S5 or S6 is multiplied by weighting coefficients and distributed to downstream

3 pixels in Step S7. Thus, the error from the threshold process is diffused to adjacent pixels. The coefficients conventionally used to diffuse the error to adjacent downstream pixels are illustrated in FIG. 23.

In FIG. 23, X represents the current pixel being thresholded. The weighted errors from this threshold process are diffused to adjacent downstream pixels according to preselected coefficients. For example, the weighting coefficient for the next pixel in the same scanline conventionally is $7/16$, whereas the coefficient for the pixel that is one over in the fastscan direction and one down in the slowscan direction from the currently processed pixel is $1/16$.

In describing the error diffusion process, it is assumed that the video value is in a range between 0 and 255. However, any chosen range for the video signal can be utilized. As described above, in conventional error diffusion methods, the binarization of the pixel or the reduction of its grey level is determined by comparing a modified input with a threshold. The modified input video signal is the input video signal, V, plus an accumulated error term, $e_i$, determined from the processing of previous pixels.

However, to implement such a method, a print engine or system would require a multi-level error diffusion process followed by screen thresholding. Moreover, the error from the screening process is not diffused and thus, banding and the other described artifacts may still form Also, any screening process must be able to exploit the full dynamic range of the image processing system Therefore, it is desirable to provide screening, but without departing from the typical image processing architecture of printing system, which significantly reduces the image artifacts and exploits the full dynamic range.

SUMMARY OF THE PRESENT INVENTION

A first aspect of the present invention is a method of reducing a number of levels in a multi-level grey scale pixel value representing a pixel and diffusing an error generated from reducing the number of levels. The method receives the multi-level grey scale pixel value having a first resolution. The multi-level grey scale pixel value is screened such that the screened pixel value is equal to $(G_L-V_i)+(S_i-Th)$ wherein $G_L$ is the maximum grey level value of the pixel, $V_i$ is equal to the multi-level grey scale pixel value of the first resolution, $S_i$ is equal to a screen value corresponding to a position of the pixel, and Th is a threshold value. The number of levels in the screened multi-level grey scale pixel value is then reduced and an error value is generated as a result of the reduction process. The error value is diffused to multi-level grey scale pixel values of adjacent pixels.

A second aspect of the present invention is a system for reducing a number of levels in a multi-level grey scale pixel value representing a pixel and diffiusing an error generated from reducing the number of levels. The system includes input means for receiving the multi-level grey scale pixel value, the multi-level grey scale pixel value having a first resolution. Screening means screens the multi-level grey scale pixel value such that the screened pixel value is equal to $(G_L-V_i)+(S_i-Th)$ wherein $G_L$ is the maximum grey level value of the pixel $V_i$ is equal to the multi-level grey scale pixel value of the first resolution, $S_i$ is equal to a screen value corresponding to a position of the pixel, and Th is a threshold value, and means reduces the number of levels in the screened multi-level grey scale pixel value. Error means generates an error value as a result of the reduction. Error diffusing means diffuses the error value to multi-level grey scale pixel values of adjacent pixels.

4

A third aspect of the present invention is a method of generating an error value. The method screens a multi-level grey scale pixel value representing a pixel having a first resolution such that the screened pixel value is equal to $(G_L-V_i)+(S_i-Th)$ wherein $G_L$ is the maximum grey level value of the pixel $V_i$ is equal to the multi-level grey scale pixel value of the first resolution, $S_i$ is equal to a screen value corresponding to a position of the pixel and Th is the averaged screen values value, and thresholds the multi-level grey scale pixel value representing the pixel having the first resolution. An error value is generated as a result of thresholding the multi-level grey scale pixel value. The error value has a second resolution lower than the first resolution.

A fourth aspect of the present invention is a printing system for rendering marks on a recording medium. The system includes receiving means for receiving a multi-level grey scale pixel value representing a pixel having a first resolution and screening means for screening the multi-level grey scale pixel value such that the screened pixel value is equal to $(G_L-V_i)+(S_i-Th)$ wherein $G_L$ is the maximum grey level value of the pixel $V_i$ is equal to the multi-level grey scale pixel value of the first resolution, $S_i$ is equal to a screen value corresponding to a position of the pixel, and Th is a threshold value. Interpolation means converts the screened multi-level grey scale pixel value to a second resolution, the second resolution being higher than the first resolution. Binarization means binarizes the converted multi-level grey scale pixel value so as to output a binary signal and an error value, the error value having a resolution equal to the first resolution. Diffusing means diffuses the error value to multi-level grey scale pixel values corresponding to pixels adjacent to the pixel having the first resolution, and rendering means converts the binary signal into a mark on the recording medium.

A fifth aspect of the present invention is a system for screening a multi-level grey scale pixel value. The system includes receiving means for receiving a multi-level grey scale pixel value representing a pixel having a first resolution, and screening means for generating a screened multi-level grey scale pixel value such that the screened pixel value is equal to $(G_L-V_i)+(S_i-Th)$ wherein $G_L$ is the maximum grey level value of the pixel, $V_i$ is equal to the multi-level grey scale pixel value of the first resolution, $S_i$ is equal to a screen value corresponding to a position of the pixel, and Th is a threshold value. Interpolation means converts the screened multi-level grey scale pixel value to a second resolution, the second resolution being higher than the first resolution, and binarization means binarizes the converted multi-level grey scale pixel value so as to output a binary signal and an error value, the error value having a resolution equal to the first resolution.

Further objects and advantages of the present invention will become apparent from the following descriptions of the various embodiments and characteristic features of the present invention

BRIEF DESCRIPTION OF THE DRAWINGS

The following is a brief description of each drawing used to describe the present invention, and thus, are being present for illustration purposes only and should not be limitative of the scope of the present invention, wherein.

DETAILED DESCRIPTION OF THE PRESENT INVENTION

Figure 1:
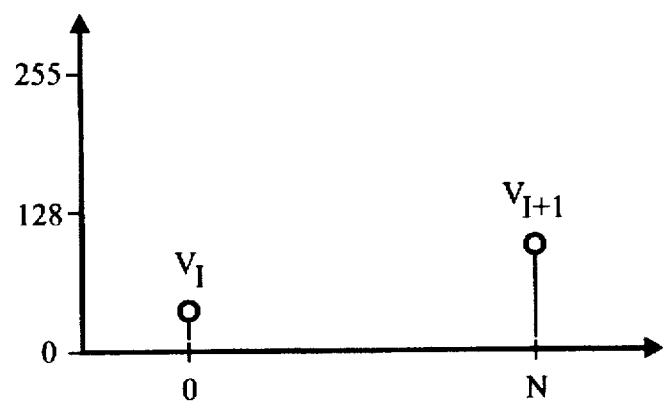
FIG. 1 shows a graphical representation of obtaining boundary subpixel values.
Figure 2:
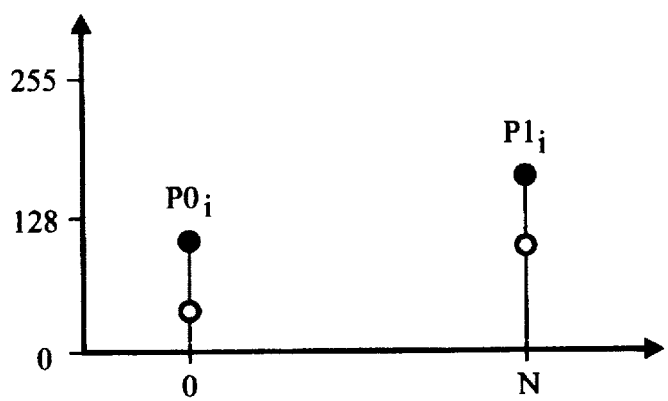
FIG. 2 shows a graphical representation of modifying the obtained boundary subpixel values with an error component.

The following will be a detailed description of the drawings illustrated in the present invention.

Typically, the image processing architecture of a printing system uses either the functions of screening, thresholding, or error diffusion. For pixels to be thresholded, a modified video signal $V_T'$, is computed from the pixel video signal V. The modified video signal, $V_T'$, is defined as $V_T'=(T+255-V)/2$ in a system having 256 grey levels. In this definition, T is the desired threshold level. It is noted that for T and V between 0 and 255, the computed V' will also be in the range of 0 to 255.

For pixels to be screened, a similar modified video signal, $V_S'$, is computed from the pixel video signal V and the screen value S at the pixel location. The modified video signal, $V_S'$, for a screening process is defined as $V_S'=(S+255-V)/2$ in a system having 256 grey levels. The screen value S depends on the pixel location as well as the halftone screening pattern being used. It is noted that either a line screen or a dot screen can be used.

For pixels to be rendered by error diffusion, the modified video signal is simply the video signal inverted. More specifically, the modified video signal is defined as $V_{ED}'= 255-V$ in a system having 256 grey levels.

In the final step of binarization, all the modified video signals; $V_T'$, $V_S'$, and $V_{ED}'$; are compared with 128 to determine the ON or OFF characteristics of the pixel. Namely, if the modified video signal is greater than or equal to 128, the pixel should be OFF (black), otherwise it should be ON (white). It is noted that this gives the same result as the more typical approach of comparing the video V itself with the threshold T or the screen values S. In the case of error diffusion, the appropriate error propagated from the previous pixels must be added to V' before comparing with 128 and the error to be propagated to downstream pixels must also be computed afterwards.

However, as noted above, it is desirable to screen the video signal at a higher frequency while maintaining the available number of grey levels. To realize this result, it has been proposed to utilize an image processing system which performs a screening process prior to an error diffusion process. More specifically, this hybrid error diffusion process, in a system having 256 grey levels, first computes the modified video signal $V_S'$ utilizing the screening method disclosed above. This computation uses screen values from a small one-dimensional screen cell. After computing the modified video signal $V_S'$, the screened modulated video signal V' is processed by an error diffusion process. In the preferred embodiment of the hybrid error diffusion system, this error diffusion process is a high addressability error diffusion process.

Although this hybrid approach provides a good reproduction of the scanned image, the hybrid approach still encounters a few problems. For example, as illustrated in FIGS. 36 and 37, the distribution error generated for a hybrid process utilizing the screening equation described above, (screening and error diffusion), is not compatible with a straight error diffusion process because the white reference points, (dotted lines), and black reference points, (dotted lines), are not the same for both processes.

Figure 36:
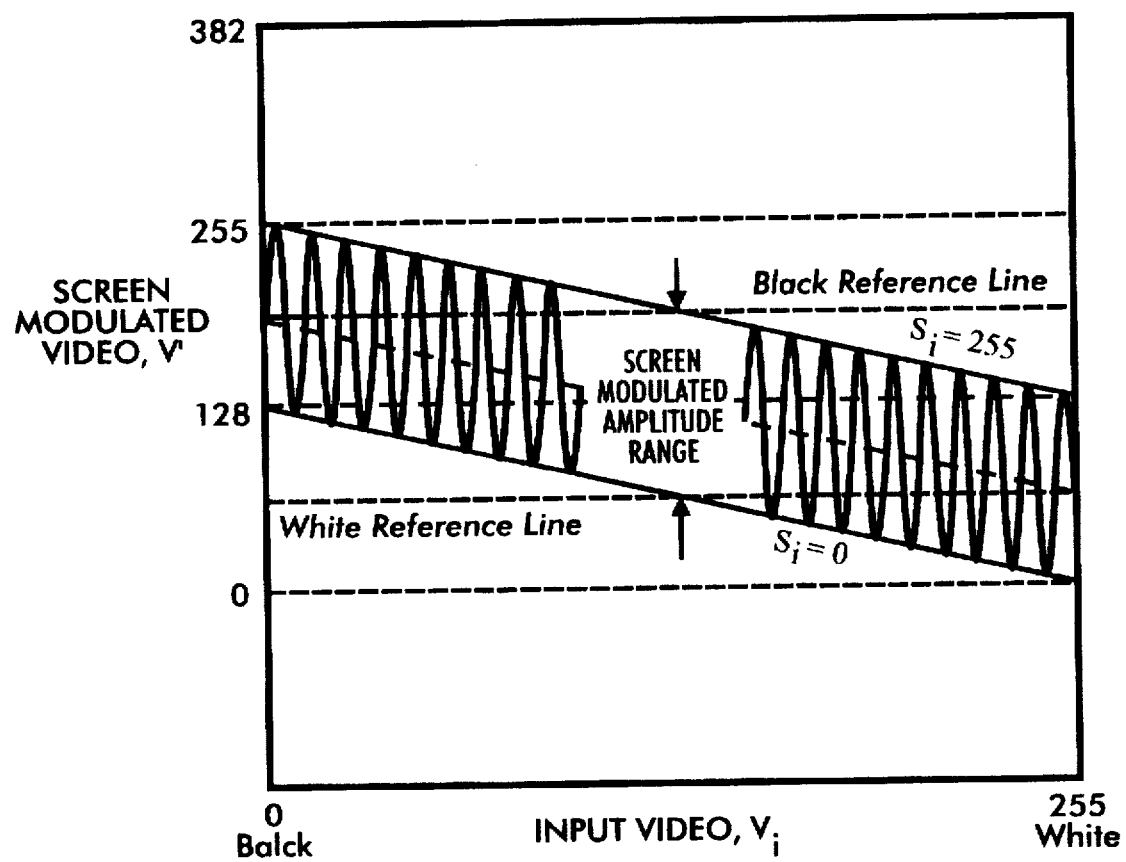
FIG. 36 shows a graphical representation of a hybrid video transformation.
Figure 37:
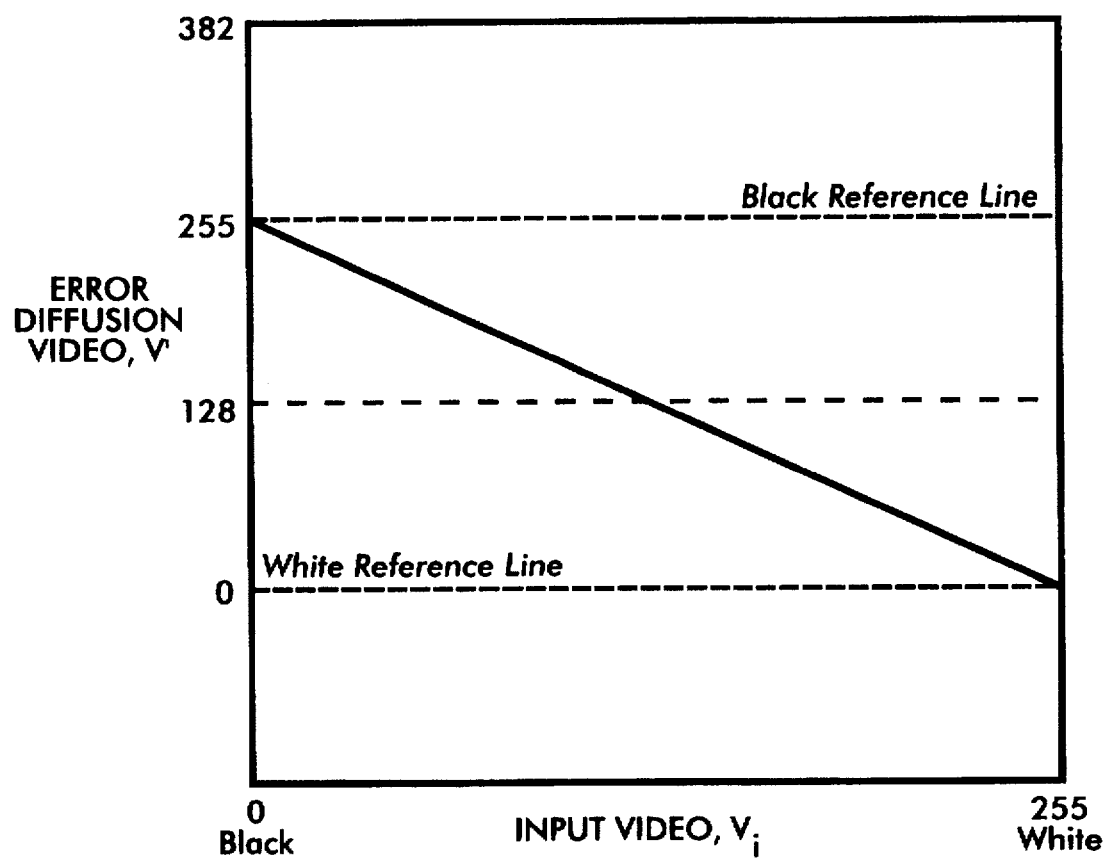
FIG. 37 shows a graphical representation of an error diffusion video transformation.

FIG. 36 illustrates a hybrid video transformation for an eight-bit grey scale system where the modified video signal V' is equal to $(S_i+255-V_i)/2$, whereas FIG. 37 illustrates an error diffusion video transformation for an eight-bit grey scale system where the modified video signal V' is equal to $255-V_i$. It is noted that these illustrations can be expanded to any size multi-bit grey scale system by changing the value of 255 to the maximum grey level value for a pixel in the system.

In these situations, FIG. 36 shows that the black reference line is equal to 192, whereas FIG. 37 shows that the black reference line is equal to 255. Moreover, FIG. 36 shows that the white reference line is equal to 64, whereas FIG. 37 shows that the white reference line is equal to 0. Such a disparity between the reference levels causes undesirable border artifacts when mixing the two image processing modes. These artifacts are most likely to occur in segmented images, images processed using some form of image segmentation wherein one region has been classified for straight error diffusion and an adjacent region has been classified for hybrid error diffusion processing (screening plus error diffusion).

Figure 31:
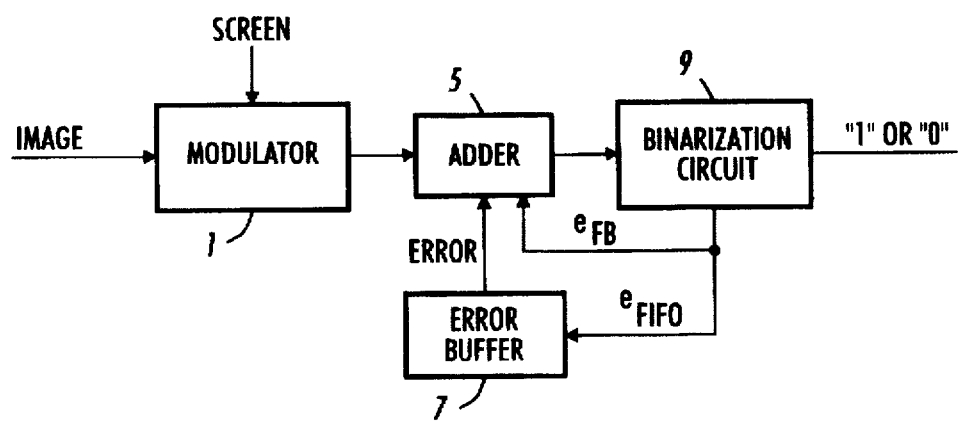
FIG. 31 shows a block diagram illustrating a screening/binarization process.
Figure 32:
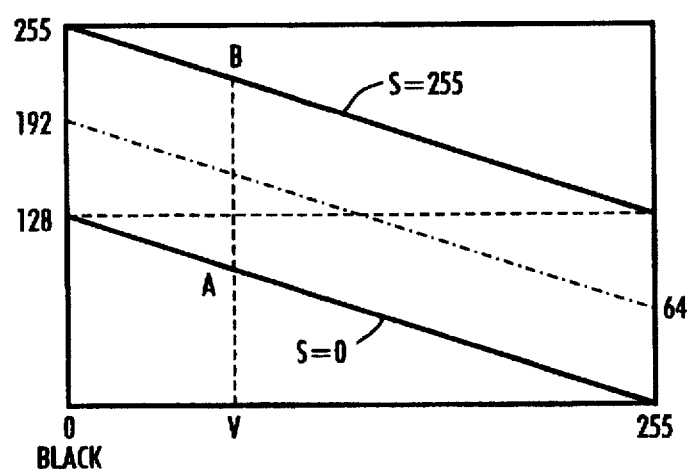
FIG. 32 shows a graphic representation of a typical screening process.

FIG. 31 illustrates a circuit which performs a screening/error diffusion process on an eight-bit image value that reduces the problems associated with the straight hybrid process. In FIG. 31, an unmodified video or image signal is screened by modulator 1 to produce a modified signal $V_S'$ using the preferred equation of $V_S'=(G_L-V_i)+(S_i-Th)$ wherein $S_i$ is equal to screen values derived from a halftone screen pattern, $V_i$ is the grey input video, $G_L$ is a maximum grey level value for a pixel in the system, and Th is the threshold value used in the binarization process.

This modified signal $V_S'$ is fed into adder 5 where the signal is further modified by the addition of an error value propagated from upstream processed pixel locations to produce $V_S''$ ($V_S''=V_S'+e_i$). The error component ($e_{FIFO}+e_{FB}$) utilized by adder 5 is received from error buffer 7 ($e_{FIFO}$) which stores the propagated error and binarization circuit 9 ($e_{FB}$).

The further modified signal $V_S''$ is fed into binarization circuit 9 which converts the multi-level modified signal $V_S''$ to a binary output by utilizing an error diffusion/threshold process. Some of the error ($e_{FB}$) from this process is fed back directly to the next to be processed pixel, while the rest ($e_{FIFO}$) is stored in the error buffer 7 for processing of pixels in the next scanline. The apportionment of the error is based on weighting coefficients. Any set of coefficients can be used. In the preferred embodiment of the present invention, the weighting coefficients are the coefficients described in U.S. Pat. No. 5,353,127. The entire contents of U.S. Pat. No. 5,353,127 are hereby incorporated by reference.

In this binarization process, the error that is produced represents the difference between the desired output, the multi-level image data value, and the actual output value which is either 255 or 0 if the multi-level of the image data is represented by 8 bits. This error is diffused, thereby retaining as much grey level information as possible.

Figure 38:
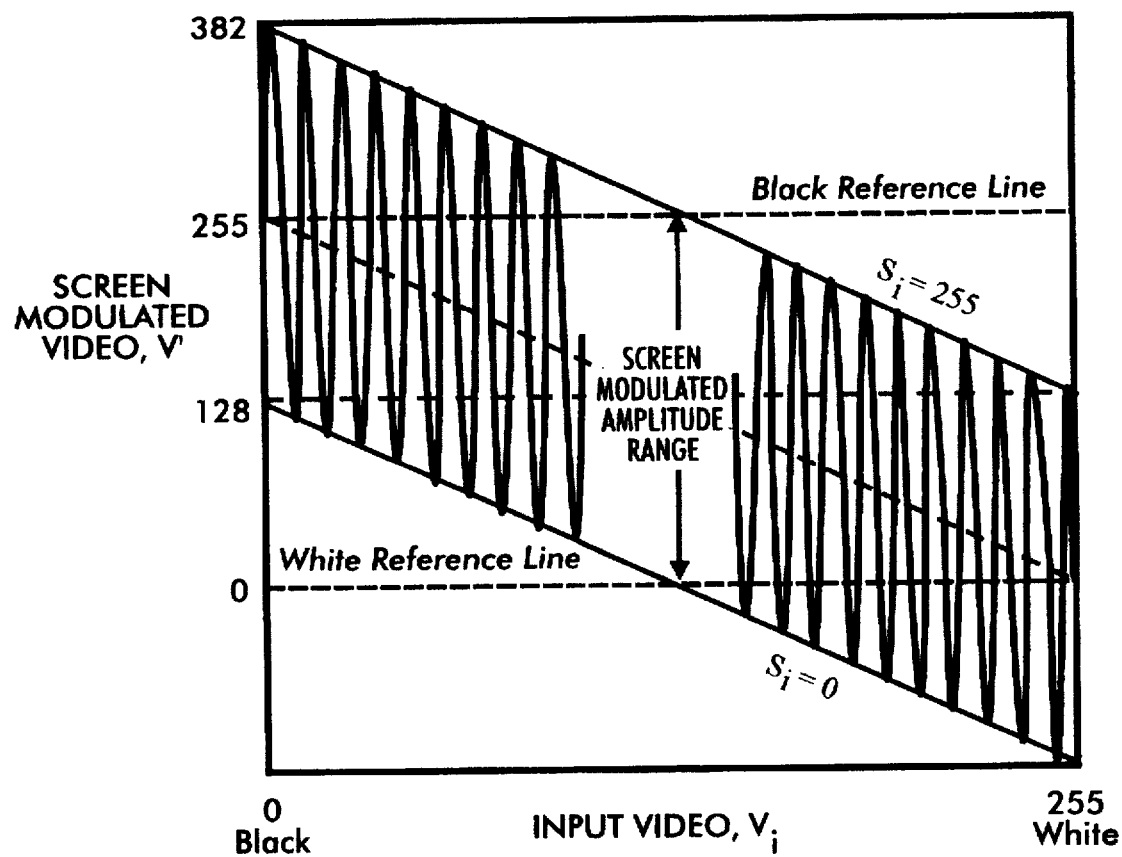
FIG. 38 shows the graphical representation of a hybrid video transformation according to the present invention.

By using the circuit of FIG. 31, the present invention can realize a hybrid video transformation for an eight-bit grey scale system as illustrated in FIG. 38. This hybrid video transformation realizes a black reference line value of 255 and a white reference line value of 0, the same as the error diffusion video transformation illustrated in FIG. 37. Moreover, the hybrid modulation covers the entire 8-bit video range, thereby expanding the dynamic range of the hybrid image processing system.

As noted above, in the preferred embodiment, the error diffusion process is a high addressability error diffusion process; therefore, the screening/high addressability error diffusion process will be explained in more detail below. Initially, the high addressability error diffusion process will be briefly described.

To extend the conventional error diffusion process, described above, to a high addressability environment, the binarization (threshold) is performed at a higher spatial resolution, but the error computation and propagation is performed at the original lower spatial resolution. This splitting of the process substantially prevents or reduces the number of isolated subpixels, thereby maintaining high image quality. This high resolution/low resolution method of the present invention will be explained in more detail below.

In explaining the high addressability error diffusion process, it is assumed that the input grey levels at pixel location i and pixel location i+1 are represented by $V_i$ and $V_{i+1}$, respectively, wherein $V_i'=(G_L-V_i)+(S_i-Th)$, and $V_{i+1}'=(G_L-V_{i+1})+(S_{i+1}-Th)$. The rendering error, at the lower resolution, that passes from upstream pixels to the downstream pixel location is denoted by $e_i$.

It is noted that a feature of high addressability involves interpolation between pixels, the creation of subpixels. This interpolation impacts the high addressability error diffusion process. More specifically, depending on the way the interpolation is done, two distinct outputs can be obtained utilizing the high addressability error diffusion process of the present invention. Each one of these distinct outputs will be discussed below.

With respect to a first interpolation scheme, the steps for determining the printing or rendering of a subpixel are as follows.

Initially, the modified pixel values $P0_i=V_{i-1}+e_{i-1}$ and $P1_i=V_i+e_i$ are computed wherein $V_i'=(G_L-V_i)+(S_i-Th)$, and $V_{i-1}'=(G_L-V_{i-1})+(S_{i-1}-Th)$. The subpixels are denoted by 0 to N−1 wherein the high addressability characteristic is N. The high addressability characteristics is the number of subpixels that a printer can produce compared to the throughput bandwidth of the image processing system. In other words, the high addressability characteristic defined as the number of subpixels that the image output terminal can render from one pixel of image data.

High addressability is important in situations where the device can process the image data at one resolution, but at a higher resolution. In such a situation, the present invention can take advantage of a processing system designed for a lower resolution image, (lower resolution can be processed quicker and less expensively), and a printing device which, through laser pulse manipulation, can print at a higher resolution. For example, the image can be processed at 600×600×8 and printed at 2400×600×1 using the high addressability process of the present invention. In the above example, the high addressability characteristic is 4. If the image was processed at 600×600×8 and printed at 1200×600×1, the high addressability characteristic would be 2.

The interpolated subpixel values are computed as $B_n = P0 + n(P1-P0)/N$ for $n=0$ to $N-1$. The interpolated subpixel values are then compared with a threshold value which in most cases is 128, assuming that the video value ranges from 0 to 255 ($G_L$ is equal to 255). If $B_n$ is greater than or equal to 128, the subpixel is turned ON; otherwise, the subpixel is turned OFF. The error to be propagated to downstream pixels is computed as the desired output, $(P0+P1)/2$, minus the actual output, namely, $y*255/N$, wherein y is the number of subpixels turned ON. The error is then multiplied by a set of weighting coefficients and distributed to the downstream pixels as in the first version.

More specifically, the screened inputted modified video signal is divided into N subpixel units. The P0 and P1 values are computed as noted above. The computed subpixel values are compared with a threshold value, namely 128. If the subpixel value is greater than or equal to the threshold value, the subpixel value is set to the ON state. However, if the subpixel value is less than 128, the subpixel value is set to the OFF state.

Upon completing the comparison of all subpixel values, the number of ON subpixels are calculated. Moreover, the error from the threshold process is calculated so that the value represents the original lower spatial resolution. Upon calculating the error, the error is multiplied by weighting coefficients and distributed the error to downstream pixels.

Figure 24:
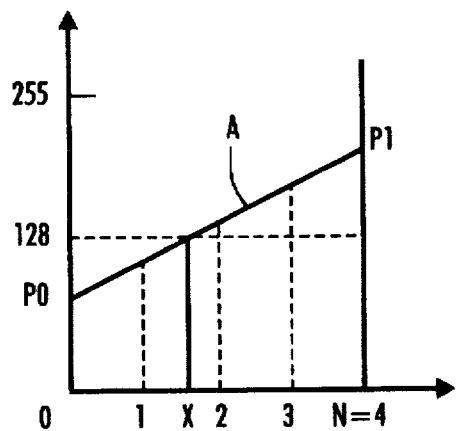
FIG. 24 shows a graph illustrating subpixel interpolation.

As noted above, the modified pixel values $P0_i = V_{i-1} + e_{i-1} = P1_{i-1}$ and $P1_i = V_i + e_i$ are computed at two locations corresponding to the input resolution wherein $V_i = (G_L - V_i) + (S_i - Th)$ and $V_{i-1} = (G_L - V_{i-1}) + (S_{i-1} - Th)$. An example of this is illustrated in FIG. 24 wherein the subpixels are denoted by 0 to N−1. In FIG. 24, the high addressability characteristic, N, is equal to 4.

As illustrated in FIG. 24, a line is drawn to connect the values P0 and P1. (The i subscripts have been dropped for simplicity.) Moreover, a dotted line is drawn to represent a threshold value of 128. (Again, it is noted that 0 to 255 is the range of the video signal; however, any range can be utilized and any threshold value may be used.) The intersection of the line connecting P0 and P1 and the line representing the threshold at 128 determines which subpixels are to be rendered or printed. The X coordinate of the point of intersection is determined and normalized to N by the equation $X = N(128-P0)/(P1-P0)$.

Next, it is determined which subpixels are to be turned ON. If X is less than or equal to 0 and if P1 is greater than or equal to 128, all the subpixels are ON; otherwise, all the subpixels are OFF. This decision represents the complete rendering or non-rendering of the pixel. To determine a partial rendering of the whole pixel, a subpixel analysis must be performed. In this instance, the value X must be compared to the individual subpixel values.

It is noted, as illustrated in FIG. 24, that the value of X does not necessarily compute to a whole number or subpixel, thereby making any analysis include a fractional component.

To avoid this, X is converted to a whole number or subpixel value. For this conversion, n is allowed to be equal to the truncated integer value of X. The values n and X can then be utilized to determine which subpixels are to be turned ON and which subpixels are to be turned OFF. More specifically, if X is greater than 0, but less than N, and if P1 is less than 128, only the subpixels from 0 to n are turned ON and the rest of the subpixels are turned OFF; otherwise, the subpixels from 0 to n are turned OFF and the rest are turned ON. If X is greater than or equal to N and if P0 is greater than or equal to 128, all subpixels are turned ON; otherwise, all subpixels are turned OFF.

This threshold process produces an error which needs to be propagated to downstream pixels. Moreover, as noted above, the error needs to be at the original low resolution input. The conversion to the original resolution is realized by determining the difference between the desired output, $(P0+P1)/2$, and the actual output, namely $b*255/N$ where b is the number of subpixels that were turned ON. The converted error is then multiplied by a set of weighting coefficients and distributed to the downstream pixels.

Figure 25:
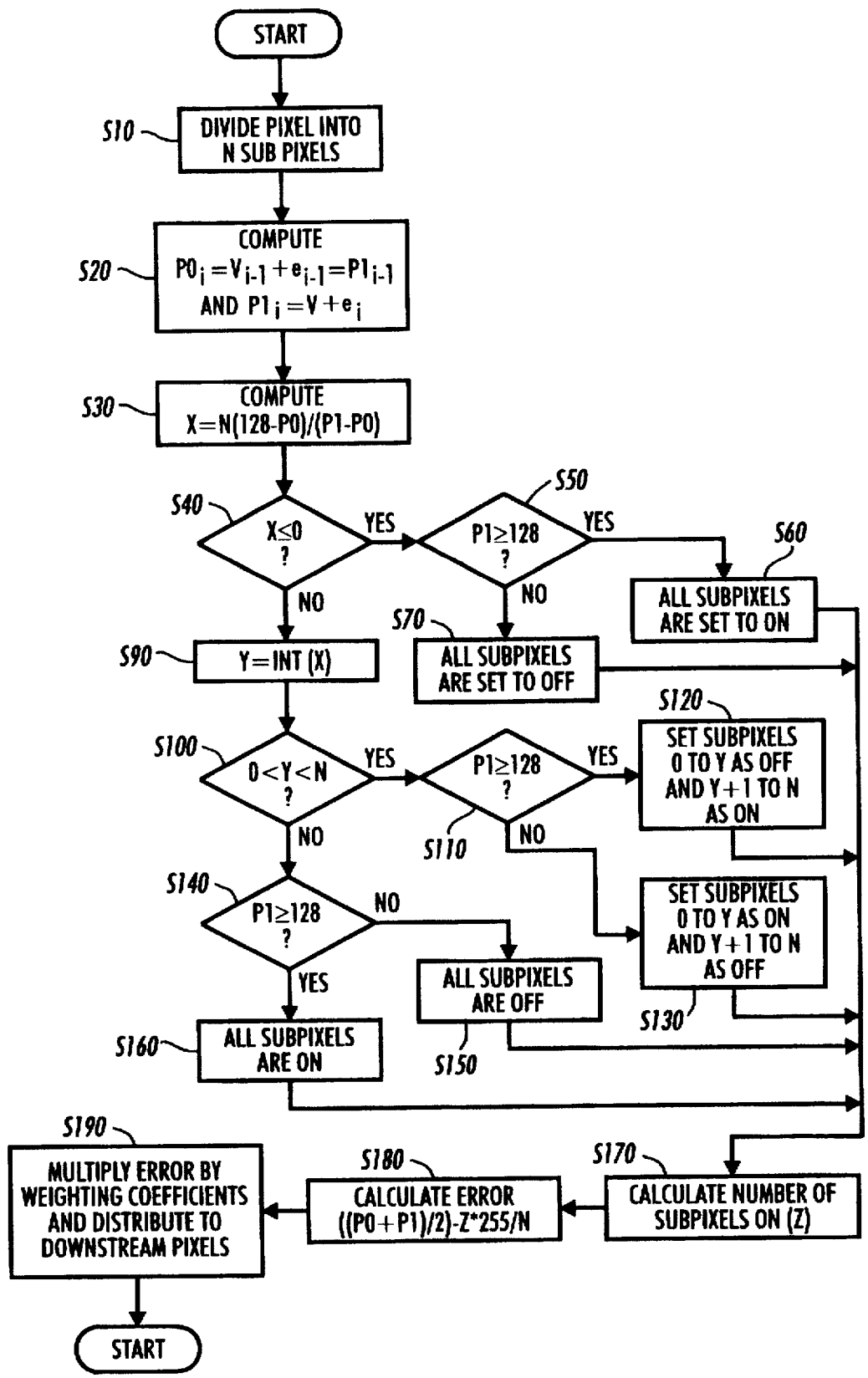
FIG. 25 shows a flowchart illustrating an error diffusion method using the interpolation schemes of FIG. 24.

FIG. 25 illustrates the actual method utilized to carry out the interpolation and error distribution process described above. In FIG. 25, at Step S10, the modified screened video input signal is divided into N subpixel values. At Step S20, the values $P0_i$ and $P1_i$ are calculated as described above. Next, at Step S30, the X-coordinate of the point of intersection is determined and normalized by multiplying the difference between 128 and P0 by the value N and dividing this product by the difference of P1 and P0. At Step S40, the normalized value X is compared with the value 0. If X is less than or equal to 0, Step S50 compares the value P1 with the value 128. If the value P1 is greater than or equal to 128, all the subpixels are set to an ON state at Step S60. However, if P1 is less than 128, Step S70 sets all the subpixels to an OFF state.

On the other hand, if Step S40 determines that X is not less than or equal to 0, Step S90 determines the integer value of X and sets this integer value equal to Y. At Step S100, the integer value Y is compared with the values 0 and N. If the value Y lies between 0 and N, Step S110 determines whether the value P1 is less than or equal to 128. If the value P1 is less than or equal to 128, Step S120 sets the subpixels 0 to Y to the ON state and the subpixels Y+1 to N to the OFF state. However, if Step S110 determines that the value P1 is greater than 128, Step S130 sets the subpixels 0 to Y to the OFF state and the subpixels Y+1 to N to the ON state.

If Step S100 determines that the value Y is not between the values 0 and N, Steps S140 determines whether the value P1 is greater than or equal to 128. If the value P1 is greater than or equal to 128, Step S160 sets all subpixels to the ON state. However, if Step S140 determines that the value P1 is less than 128, Step S150 sets all the subpixels to the OFF state.

Upon completing the processes at either Steps S60, S70, S120, S130, S150, or S160, the error diffusion method of the present invention proceeds to Step S170. At Step S170, the number of ON subpixels is calculated and set equal to Z. Next, at Step S180, the error to be propagated to the downstream pixels is calculated. Namely, the error is calculated to represent the original low spatial resolution. Upon calculating the error in Step S180, Step S190 multiplies the error by weighting coefficients and distributes the weighted error terms to downstream pixels.

The second interpolation method with respect to implementing the high addressability error diffusion method of the present invention will be describe as follows.

Figure 26:
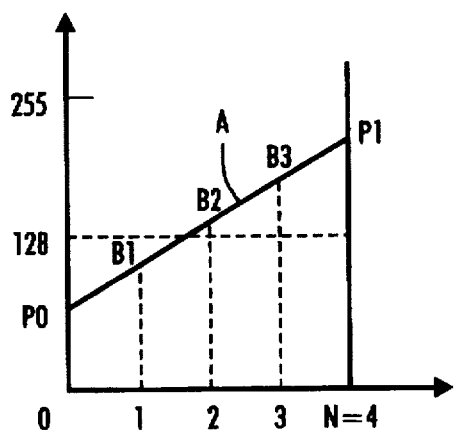
FIG. 26 shows a graph illustrating another subpixel interpolation method.

In the second interpolation method, the modified pixel values $P0_j=V_i+e_i$ and $P1_j=V_{i+1}+e_i$ are computed wherein $V_i=(G_L-V_i)+(S_i-Th)$ and $V_{i+1}=(G_L-V_{i+1})+(S_{i+1}-Th)$. FIG. 26 illustrates the values P0 and P1 for the second version of the high addressability error diffusion method of the present invention.

Figure 27:
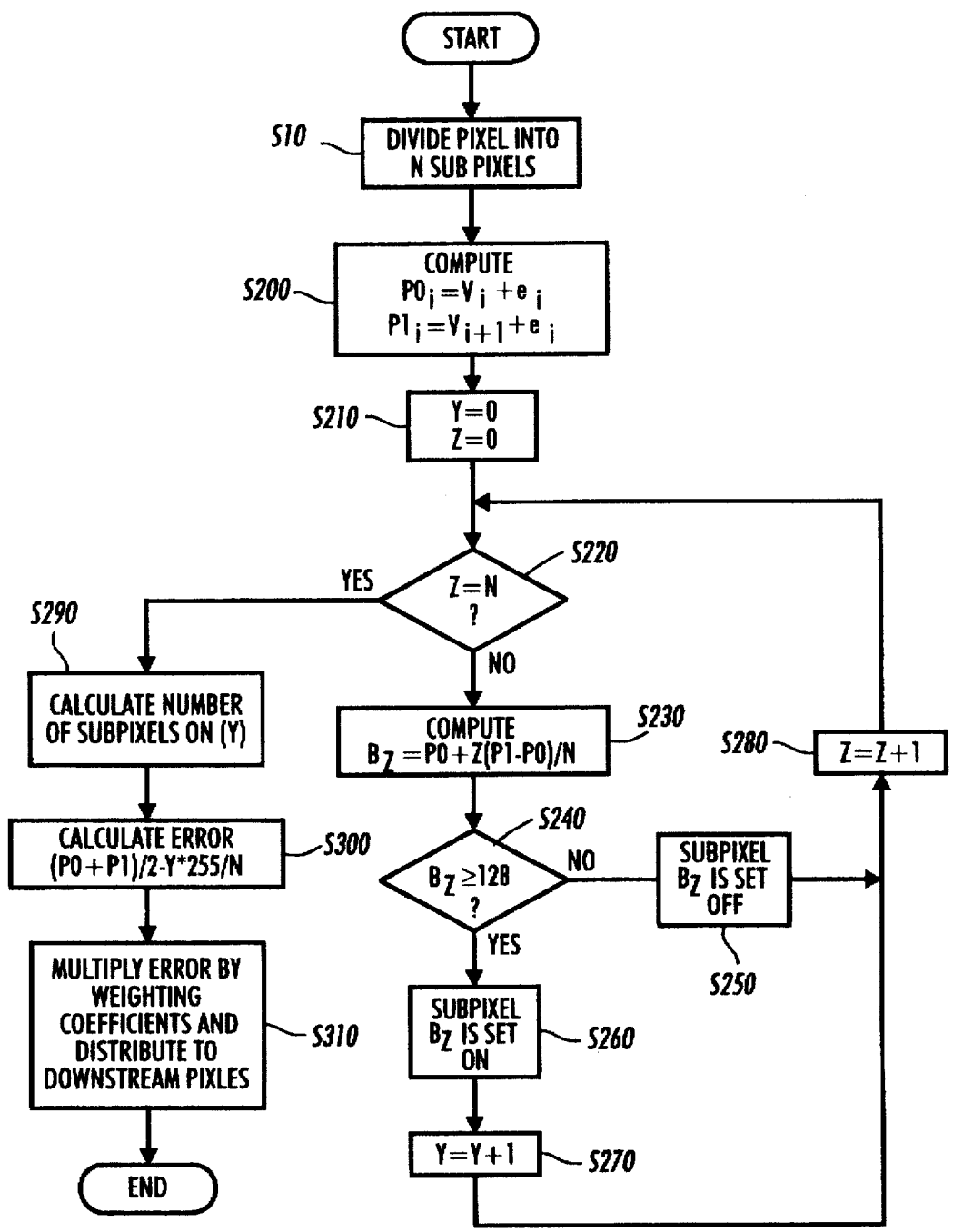
FIG. 27 shows a flowchart illustrating an error diffusion method using the interpolation scheme of FIG. 26.

FIG. 27 illustrates the process utilized in the second interpolation version of the high addressability error diffusion method of the present invention. As in the FIG. 25, the input modified video signal is divided into N subpixel units at Step S10. At Step S200, the P0 and P1 values are computed as noted above. At Step S210, the values Y and Z are set equal 0, wherein Y denotes the number of subpixels which are to be turned ON and Z denotes the addressability factor. At Step S220, Z is compared with N to determined whether all the subpixels within the modified video signal have been thresholded. If it is determined that subpixels remain to be thresholded, the process moves to Step S230 wherein the next subpixel value is computed. Step S240 then compares the computed subpixel value with the threshold value, namley 128. If the subpixel value is greater than or equal to the threshold value, Step S260 sets the subpixel value to the ON state, and Step S270 increments the value Y indicating the number of subpixels that are set ON. However, if the subpixel value is less than 128, Step S250 sets the subpixel value to OFF.

Upon the completion of either Step S250 or Step 270, the process proceeds to Step S280 wherein the high addressability value Z is incremented. This subroutine is repeated until all subpixel values within the modified video signal are compared with the threshold value. Upon completing the comparison of all subpixel values, the process advances to Step S290 wherein the number of ON subpixels are calculated. At Step S300, the error from the threshold process is calculated so that the value represents the original lower spatial resolution. Upon calculating the error, Step S310 multiplies the error by weighting coefficients and distributes the error to downstream pixels.

Figure 28:
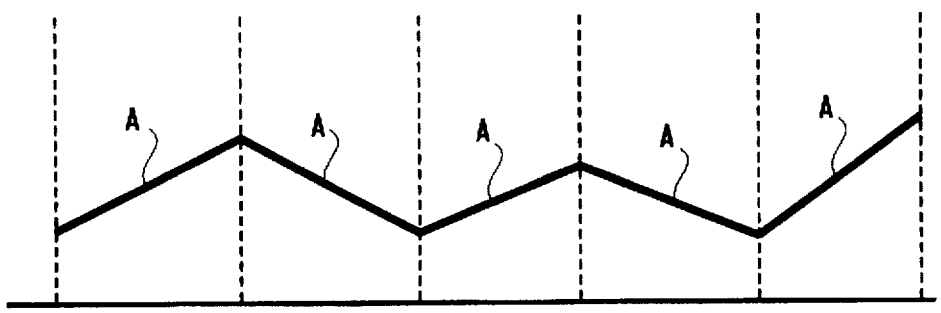
FIG. 28 and 29 show graphs illustrating the subpixel relationships for the interpolation schemes of FIGS. 24 and 26.

FIG. 28 illustrates the high addressability relationship between adjacent pixels utilizing the first interpolation version of high addressability error diffusion method. More specifically, it is noted the P1 value of the present pixel is utilized as the P0 value for the next pixel.

Figure 29:
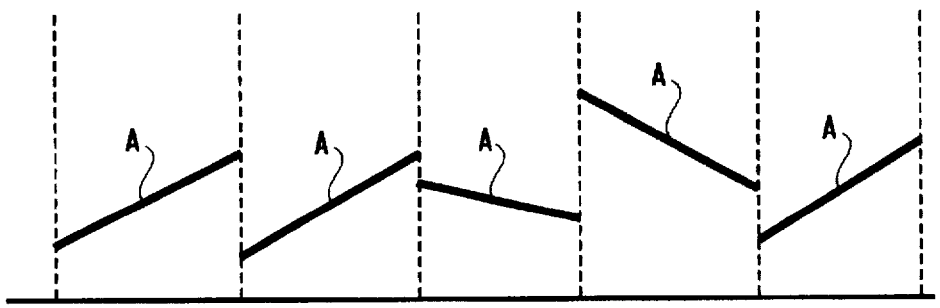
Figure 30:
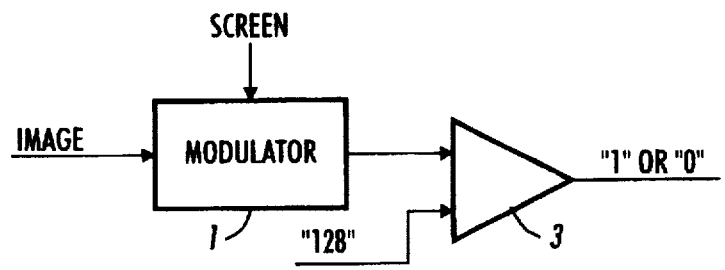
FIG. 30 shows a block diagram illustrating a typical screening circuit.

On the other hand, FIG. 29 illustrates the high addressability relationship between pixels utilizing the second interpolation version of the high addressability error diffusion method. In this case, there is discontinuity between the P1 value of the previous pixel and the P0 value of the present pixel. Thus, from these two Figures, it can be seen that the error output from the two versions of the high addressability error diffusion methods will be different.

Figures 33, 34, 35:
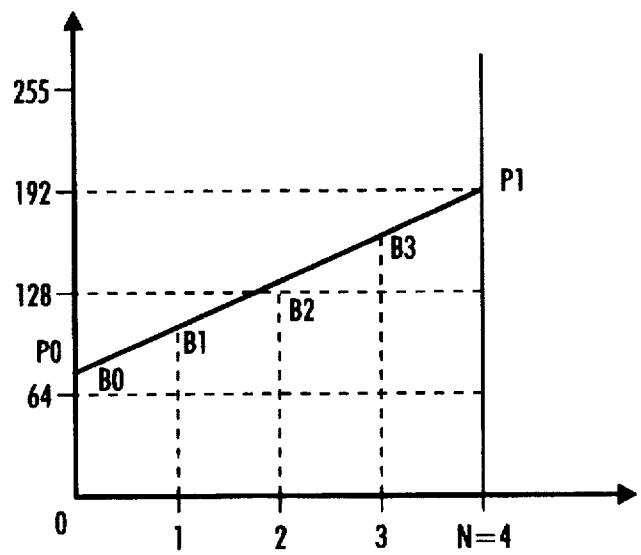
FIG. 33 shows a graphical representation illustrating interpolation and binarization processes.
FIG. 34 shows a graphic representation illustrating a vertical line screen pattern.
FIG. 35 shows a graphical representation illustrating a diagonal line screen pattern.

The high addressability error diffusion process used in conjunction with the screening process will be further explained in conjunction with FIG. 33. In this explanation, the value $e_i$ represents the rendering error propagated to the present i-th pixel from the previous pixels. At the i-th pixel location, the subpixel values are given by $P0=V_{s'i}+e_i=V_{s''i}$ and $P1=V_{s'i+1}+e_i=V_{s''i+1}$ wherein $V_{s'i}=(G_L-V_i)+(S_i-Th)$ and $V_{s'i+1}=(G_L-V_{i+1})+(S_{i+1}-Th)$. The values are used to obtain the interpolated values $B_0$ to $B_{N-1}$, as shown in FIG. 33. It is noted that the high addressability factor illustrated in FIG. 33 is N=4.

These interpolated values are then compared with 128 to determine the ON or OFF characteristics of the subpixels. If the number of subpixels rendered as black is indicated by n, the current rendering error is given by the desired output minus the actual output, $e'_i=((P0+P1)/2)-(n(255)/N)$. In other words, the actual output is defined as the desired output, (P0+P1)/2), minus the product of the number of ON subpixels and the difference between the black and white reference values divided by the high addressability characteristic. This new error is then multiplied by a set of weighting coefficients and the weighted errors are propagated to the downstream pixels.

To determine the ON or OFF characteristics, the subpixel values are processed by a number of comparison steps. An example of the actual architecture of the circuitry used to implement the high addressability error diffusion process will be discussed below.

FIGS. 1–7 illustrate the computational steps required to perform high addressability error diffusion using a particular interpolation scheme. Initially, as illustrated in FIG. 1, the pixel value $V_i$ and $V_{i+1}$ are obtained wherein $V_i=(G_L-V_i)+(S_i-Th)$ and $V_{i+1}=(G_L-V_{i+1})+(S_{i+1}-Th)$. The actual pixel values are graphically illustrated in FIG. 1, wherein the pixel value $V_i$ represents the pixel value at the subpixel position 0 and the pixel value $V_{i+1}$ represents the pixel value at the N subpixel. In FIG. 1, the pixel values range from 0 to 255 utilizing a conventional eight-bit dataword to represent the multi-level grey value of the image data to be process. It is noted that any range can be utilized to represent the grey level value of the image data; for example, 0 to 511, 0 to 127, etc.

After obtaining the initial pixel values of $V_i$ and $V_{i+1}$, a diffused error component $e_i$ (the accumulated error from previous pixel binarization processes) is added to the pixel values $V_i$ and $V_{i+1}$. It is noted that the error component $e_i$ consists of two components, $e_{FIFO}$ and $e_{FB}$, where $e_{FIFO}$ is the summed error component stored in a line buffer and $e_{FB}$ is the feedback error component. The adding of the error component $e_i$ is illustrated graphically in FIG. 2.

Figure 3:
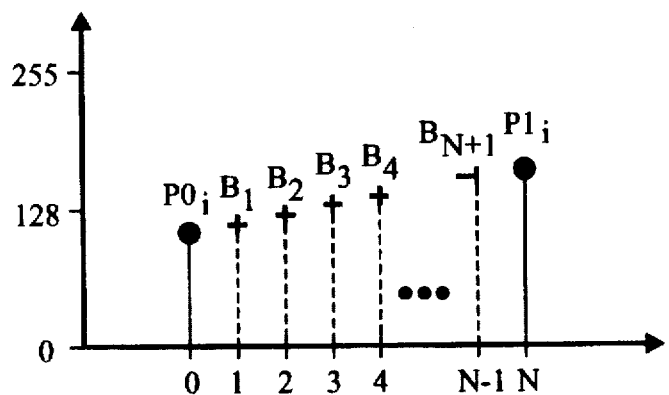
FIG. 3 shows a graphical representation of interpolating subpixel values between the modified boundary subpixel values.
Figure 4:
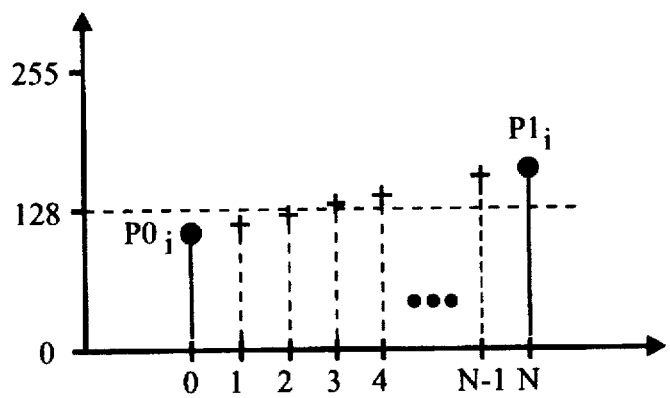
FIG. 4 shows a graphical representation of comparing the interpolated subpixel values with a threshold value.
Figure 5:
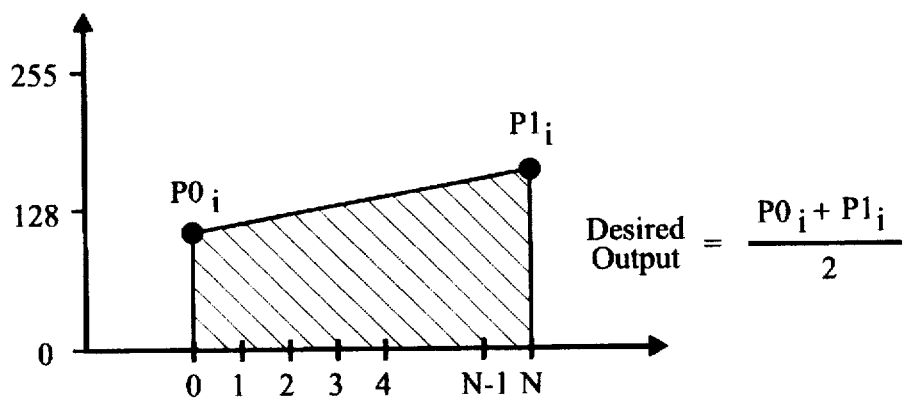
FIG. 5 shows a graphical representation of computing a desired output value.

After adding the diffused error component, the interpolated subpixel values are computed, as illustrated in FIG. 3. For example, the interpolated subpixel values are $B_n=P0_i+n(P1_i-P0_i)/N$ for n=0 to N-1, where N is the selected high addressability characteristic. It is noted that the value $P0_i$ is equal to $V_i+e_i$ and $P1_i$ is equal to $V_{i+1}+e_i$.

After computing the interpolated subpixel values, each interpolated subpixel value is compared to a threshold level. In the example illustrated in FIG. 4, the threshold value is 128. It is noted that this threshold value can be any value within the range of the image data depending upon the desired results. In this example, each subpixel which has a value greater than or equal to 128 is set ON.

Figure 6:
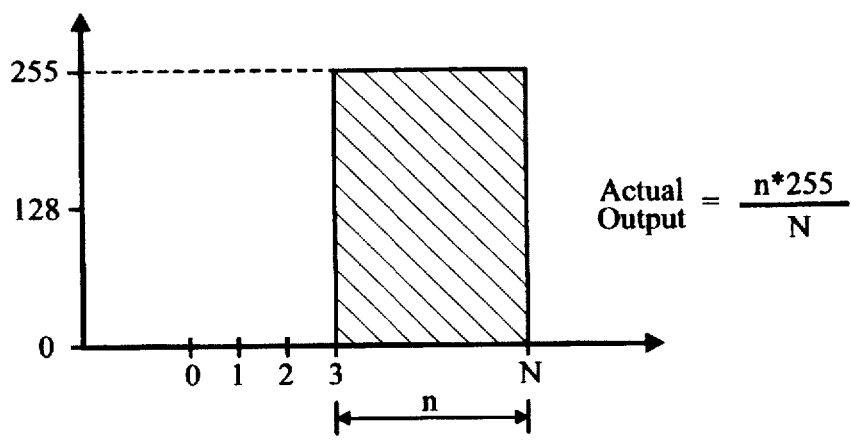
FIG. 6 shows a graphical representation of computing an actual output value.

Next, the desired output $(P0_i+P1_i)/2$ is computed. This computing of the desired output is graphically illustrated in FIG. 5. After computing the desired output, the actual output is computed. In this example, the actual output is equal to n*255/N where n is the number of subpixels that have been turned ON as the result of the comparison illustrated in FIG. 10. A graphical representation of the computed actual output is shown in FIG. 6. Once the desired output and the actual output have been computed, the error diffusion method computes the error to be propagated downstream. This error is computed as the desired output minus the actual output. A graphical representation of this computation is shown in FIG. 7.

Figure 7:
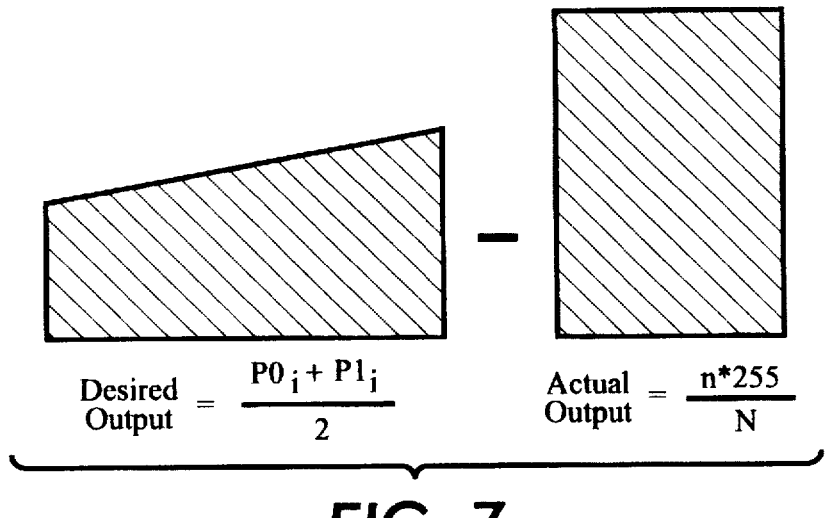
FIG. 7 shows a graphical representation of computing an error value to be propagated to downstream pixels.

As illustrated in FIG. 7, the error is calculated to be $e_{i+1}=(P0_i+P1_i)/2-(n*255/N)$. In this instance, the error $e_{i+1}$ represents the error from the present binarization process. As in all conventional error diffusion processes, the error from the binarization process is distributed to downstream pixels.

Figure 8:
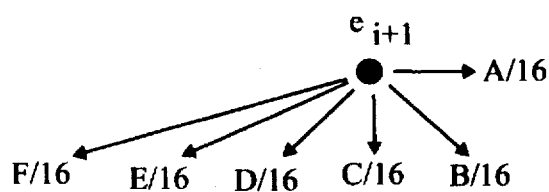
FIG. 8 shows a graphical representation illustrating actual distribution of the error in a typical error distribution routine.

The distributing of the error $e_{i+1}$ to downstream pixels is illustrated in FIG. 8. In this example, the distribution of error utilizes a set of error diffusion coefficients which allow fast processing by simple bit shifting. FIG. 8 illustrates the coefficients associated with each pixel location.

Figure 9:
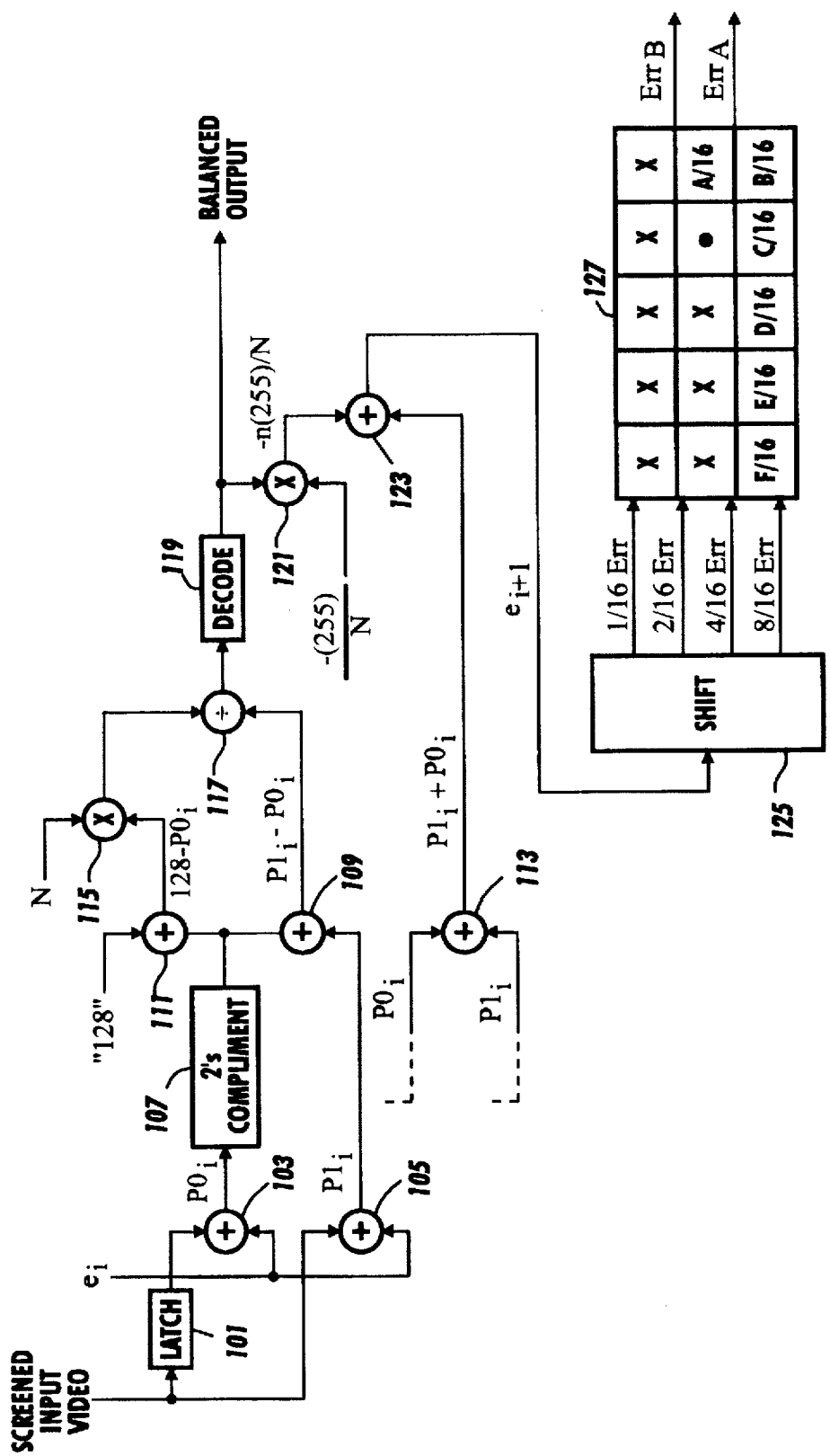
FIG. 9 shows a block diagram illustrating one embodiment of the present invention implementing a high addressability error diffusion process.

In FIG. 9, the screened input video signal is split and latched in latch 101 so as to produce the screened pixel values $V0_i$ and $V1_i$. $V0_i$ represents the latched screened input video signal $V1_i$ as noted above, and $V0_i$ represents the screened pixel value just proceeding the screened pixel value $V1_i$ in the same scanline. The screened pixel value $V0_i$ is fed into an adder 103 with the error component $e_i$. Moreover, the error component $e_i$ is fed into an adder 105 along with the screened input video signal $V1_i$. The adder 103 produces an output signal $P0_i$ which is fed into a 2's compliment circuit 107 to produce negative $P0_i$. Negative $P0_i$ is fed into an adder 109 along with the value $P1_i$ to produce the value of $P1_i - P0_i$. Negative $P0_i$ is also fed into adder 111 which is summed with the threshold value. In this example, the threshold value is 128.

The sum from adder 111 is fed into multiplier 115 so that the value $(128-P0_i)$ can be multiplied by the high addressability characteristic value N. The resulting product is then divided by the sum from adder 109 by a divider circuit 117. The resulting quotient is fed into a decoder 119. The actual function of decoder 119 is graphically illustrated in FIG. 10.

Figure 10:
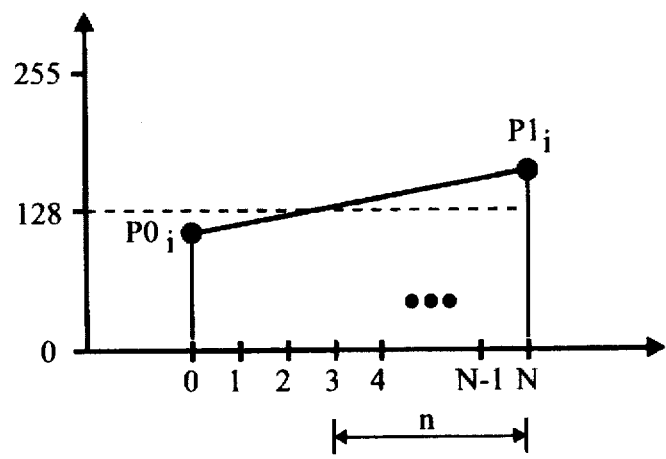
FIG. 10 shows a graphical representation illustrating a decoding process illustrated in FIG. 9.

More specifically, the decoder 119, as illustrated in FIG. 10, determines the intersection of the $P0_i/P1_i$ line and the value 128. From the determination of this intersection, the decoder 119 determines the number of subpixels n which are turned ON. The results from decoder 119 are fed as binarized output to a print engine and also to a multiplier 121. Multiplier 121 multiplies the output from decoder 119 with the value $(-255/N)$. The product of multiplier 121 is added to a sum generated by an adder 113 in adder 123. Adder 113 adds the values $P0_i$ and $P1_i$ to produce the value $P1_i + P0_i$.

The results of adder 123 represents the error component $e_{i+1}$ which is fed into a simple bit shifting circuit 125 to produce various error values that will be utilized in the distribution process. The error values generated by the bit shifting circuit 125 are fed into an error distribution circuit 127, wherein half the error $Err_B$ is distributed to the next pixel in the same scanline and the other half of the error $Err_A$ is distributed to various pixels in the next scanline according to the weighting coefficients established in the error distribution circuit 127.

Figure 11:
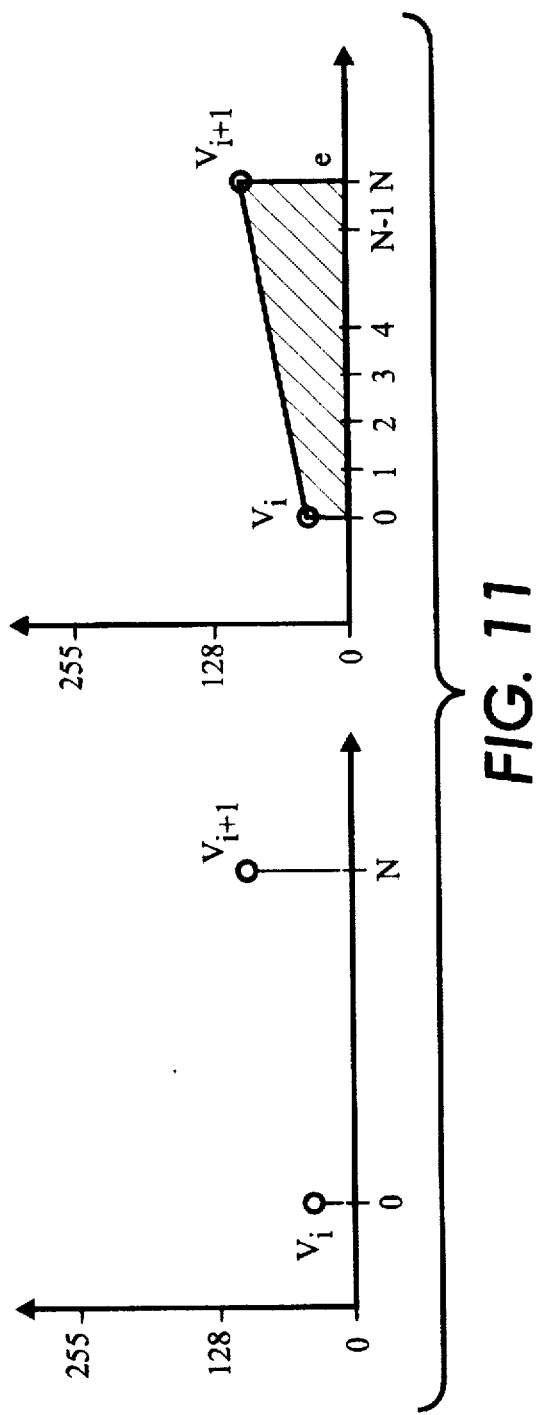
FIG. 11 shows a graphical representation illustrating the obtaining boundary subpixel values in parallel with the computing a desired output value.

FIG. 11 illustrates two parallel computations which are carried out in the present invention. More specifically, FIG. 11 illustrates that the screened pixel values $V_i$ and $V_{i+1}$ are obtained in parallel to the beginning of the computation of the desired output for a single subpixel wherein the desired output is computed without including the diffused error components $e_{FIFO}$ or $e_{FB}$.

Figure 12:
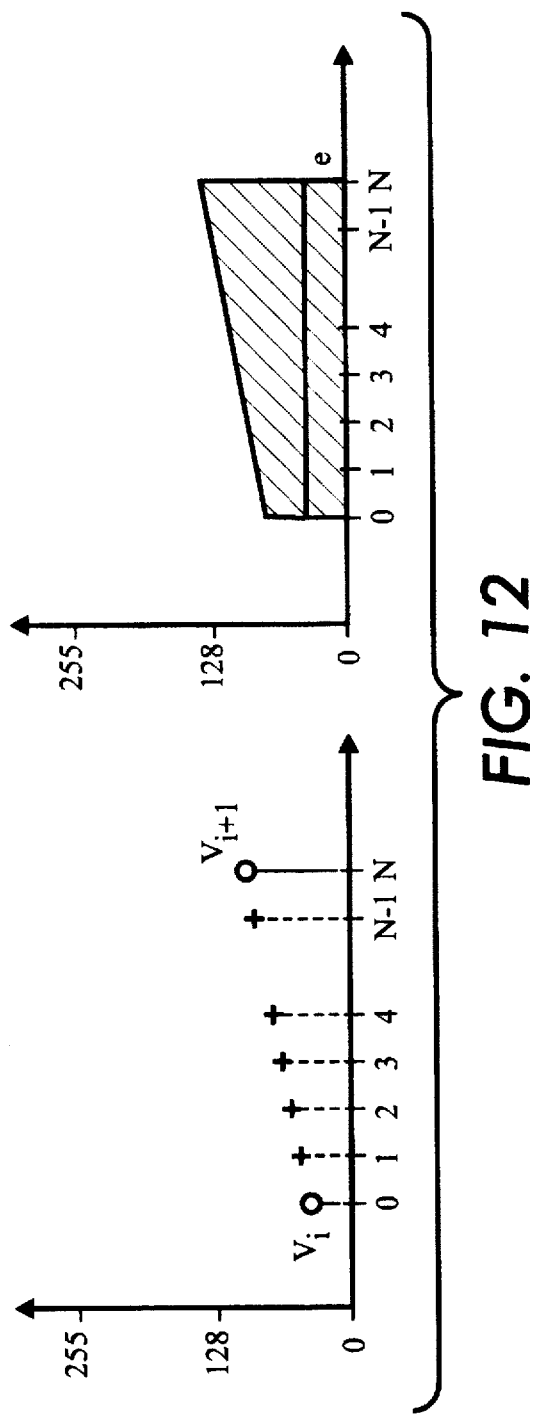
FIG. 12 shows a graphical representation illustrating the interpolating of subpixel values between the obtained boundary subpixel values in parallel with the modifying of the desired output value with an error component.

After these parallel computations are completed, the preferred embodiment of the present invention computes interpolated subpixel values in the same way as illustrated in FIG. 3. However, in parallel with this computation of the interpolated subpixel values, the desired output is continued to be computed by adding the error component $e_{FIFO}$. This is graphically represented in FIG. 12.

Figure 13:
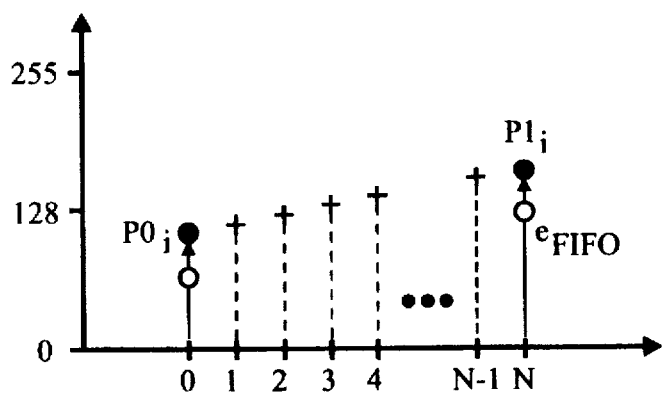
FIG. 13 shows a graphical representation illustrating the modifying of the subpixel values between the obtained boundary subpixel values with an error component.
Figure 14:
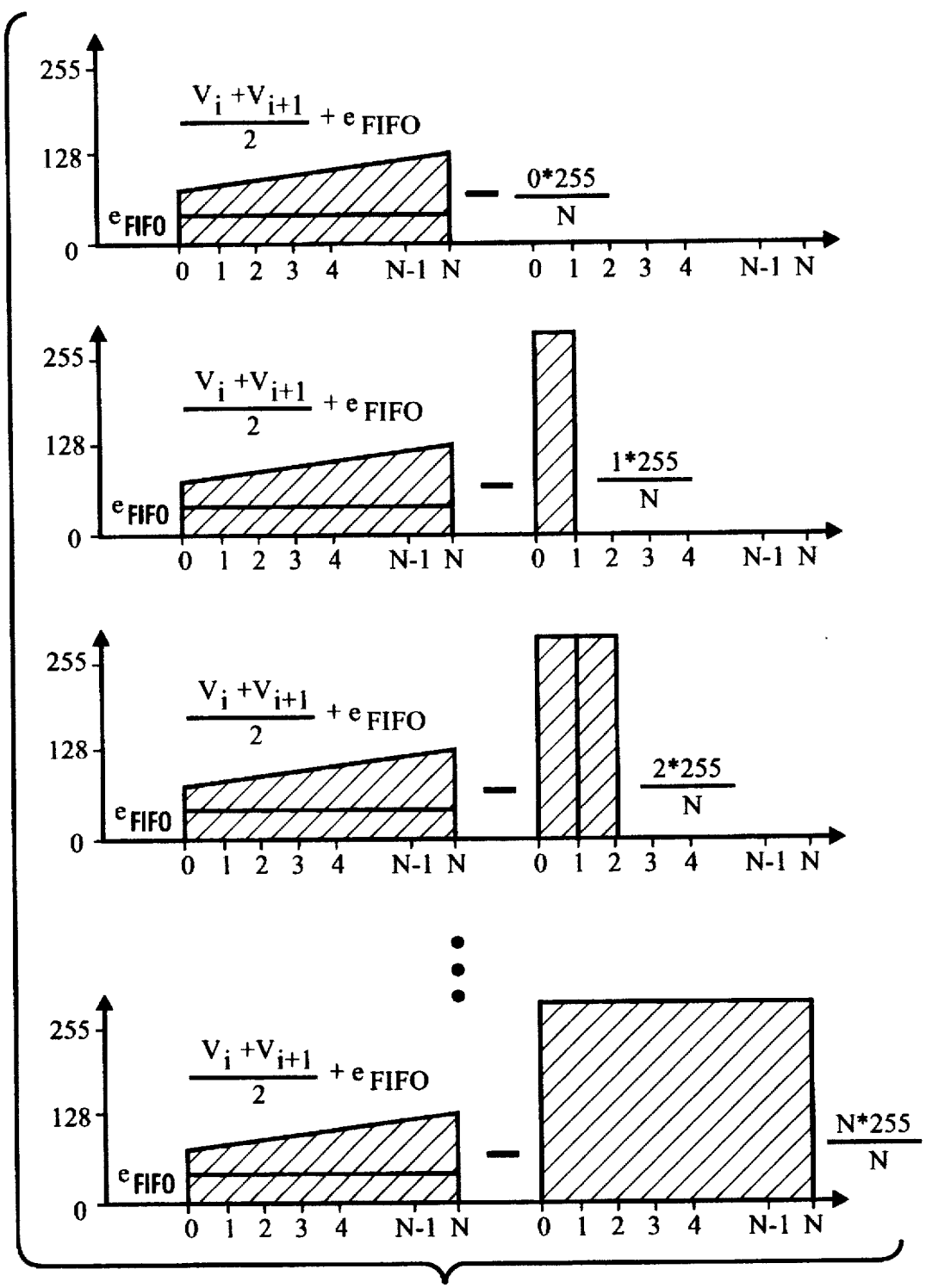
FIG. 14 shows a graphical representation illustrating the calculation of a plurality of partial possible error vales.

Next, the error component $e_{FIFO}$ is added to the screened pixel values $V_i$, and $V_{i+1}$ and the interpolated subpixels as illustrated in FIG. 13 At the same time (in parallel thereto), all possible actual subpixel outputs are subtracted from the desired output without including the diffused error component $e_{FB}$. In other words, N possible actual subpixel outputs are subtracted from the desired output computed in FIG. 12 to produce N possible error outputs $e_p$ (the desired output minus the actual output is equal to the error $e_p$). The computations illustrated in FIG. 13 are carried out in parallel with the computations illustrated in FIG. 14.

Figure 15:
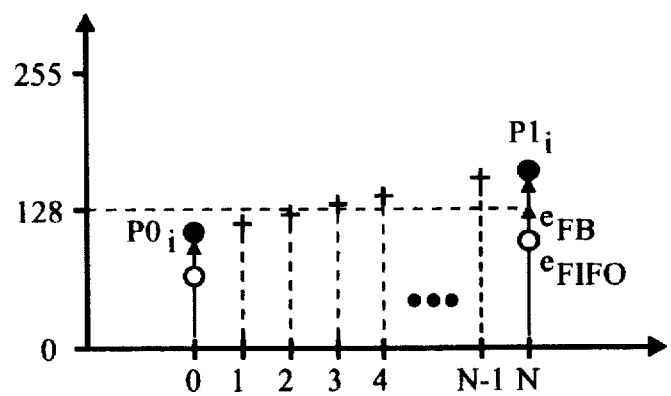
FIG. 15 shows a graphical representation of further modifying the modified subpixel values of FIG. 11 with another error component.
Figure 16:
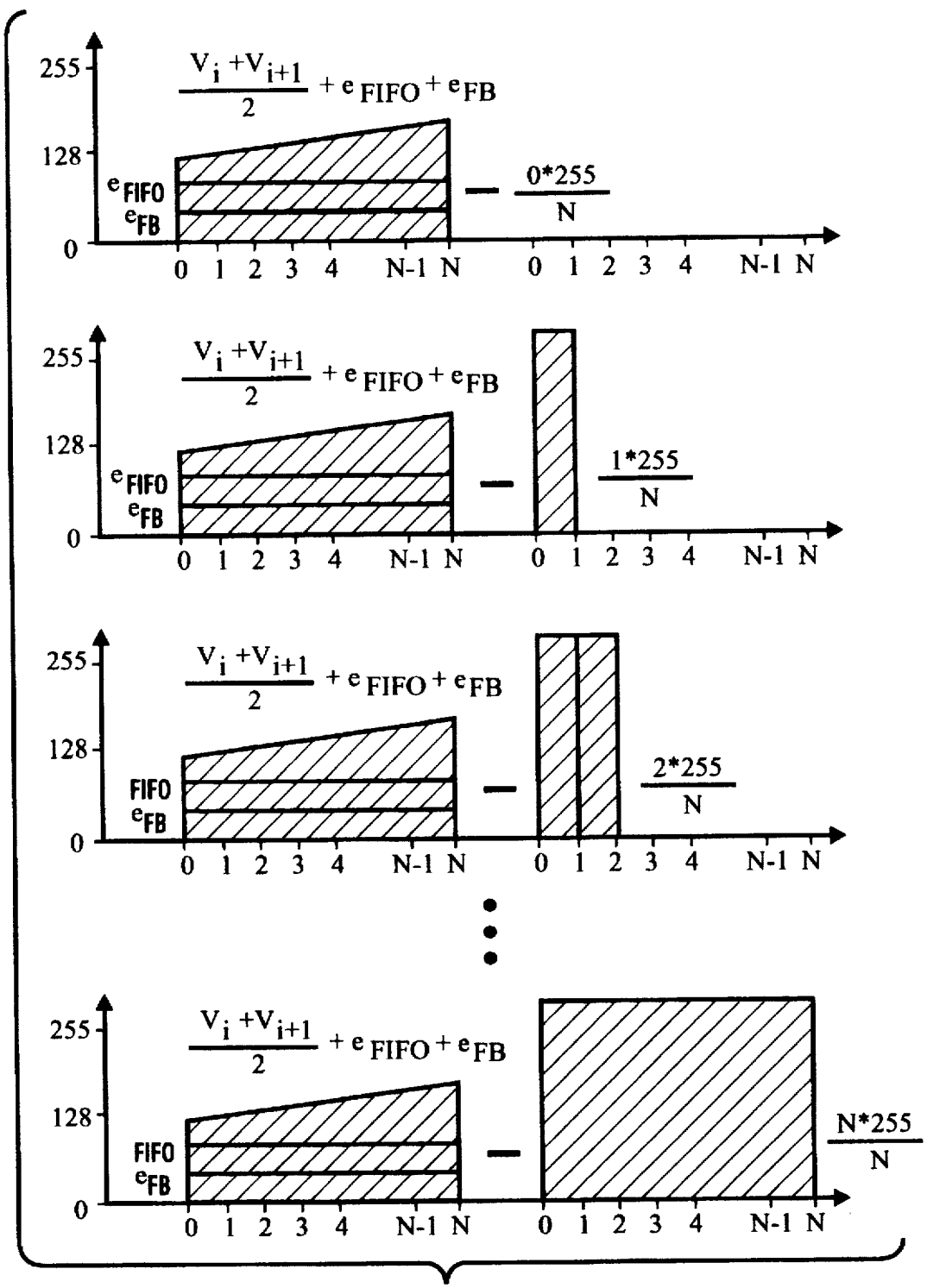
FIG. 16 shows a graphical representation illustrating the calculation of a plurality of complete possible error values.

The error component $e_{FB}$ is added to the screened pixel values $V_i$, $V_{i+1}$, and the various interpolated subpixel values as illustrated in FIG. 15. At the same time that the feedback error component $e_{FB}$ is being added in FIG. 15, the error component $e_{FB}$ is added to all possible subpixel desired outputs as illustrated in FIG. 16. In other words, the error component $e_{FB}$ is individually added to all N error results $(e_p)$ stemming from the calculations illustrated by FIG. 14.

Figure 17:
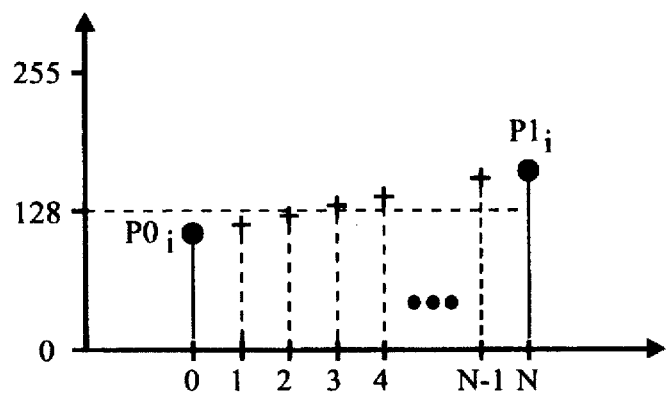
FIG. 17 shows a graphical representation of thresholding the further modified subpixel values.
Figure 18:
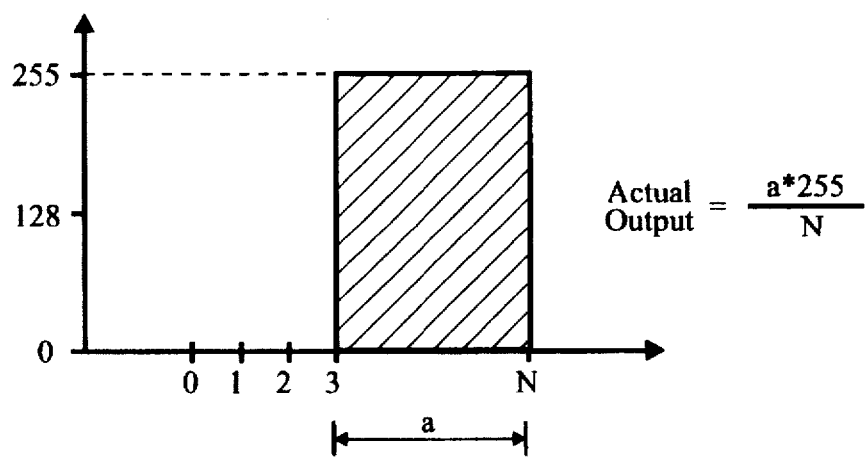
FIG. 18 shows a graphical representation of determining of number of subpixels exceeding or equal to a threshold value.
Figure 19:
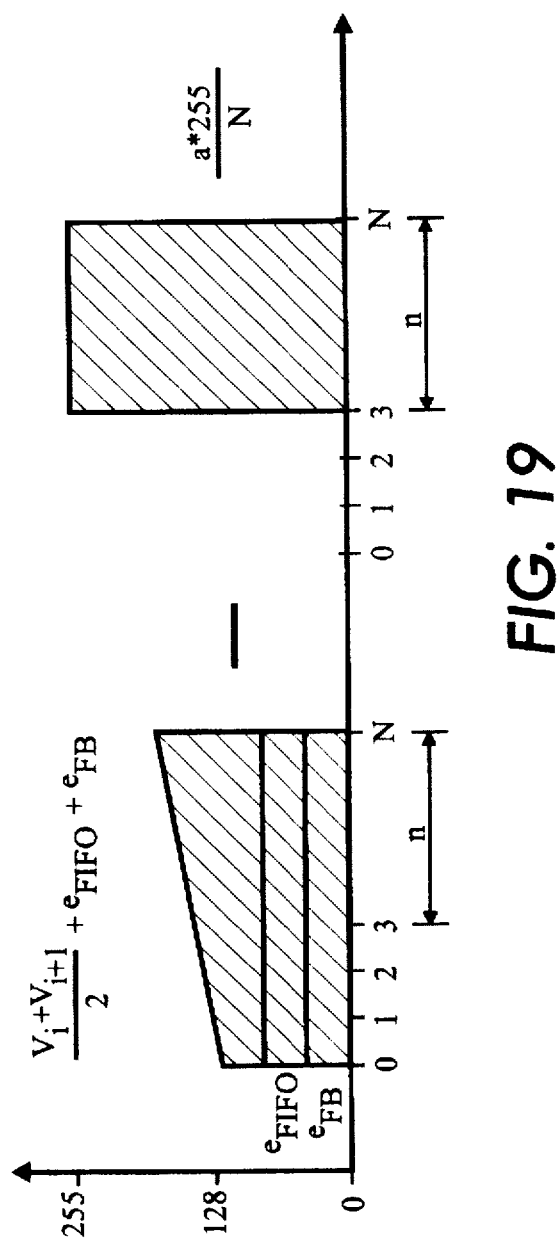
FIG. 19 shows a graphical representation of selecting one of the plurality of possible complete error values.

After completing these parallel computations, the next step includes the computations illustrated in FIGS. 17, 18, and 19. In this next step, each interpolated subpixel value is compared to a threshold value of 128, and the subpixels having a value greater than or equal to the threshold value are turned ON. This process is graphically illustrated in FIG. 17 and 18 wherein FIG. 17 shows the comparison of the interpolated subpixel values with the threshold values, and FIG. 18 shows the turning ON of the subpixels which have a value greater than or equal to the threshold value.

Since all the possible error values were made simultaneously available as a result of the computations illustrated in FIG. 16, the error to be propagated downstream can now be immediately selected; i.e., via a multiplexer, based upon the number of subpixels which are turned ON. In other words, FIG. 19 illustrates the properly selected error value from the various simultaneously available error values produced by the computations illustrated in FIG. 16. The selected error value is then distributed to downstream pixels utilizing any conventional error diffusion technique. In the preferred embodiment of the present invention, the error is distributed to downstream pixels utilizing the error diffusion coefficients discussed above.

Figure 20:
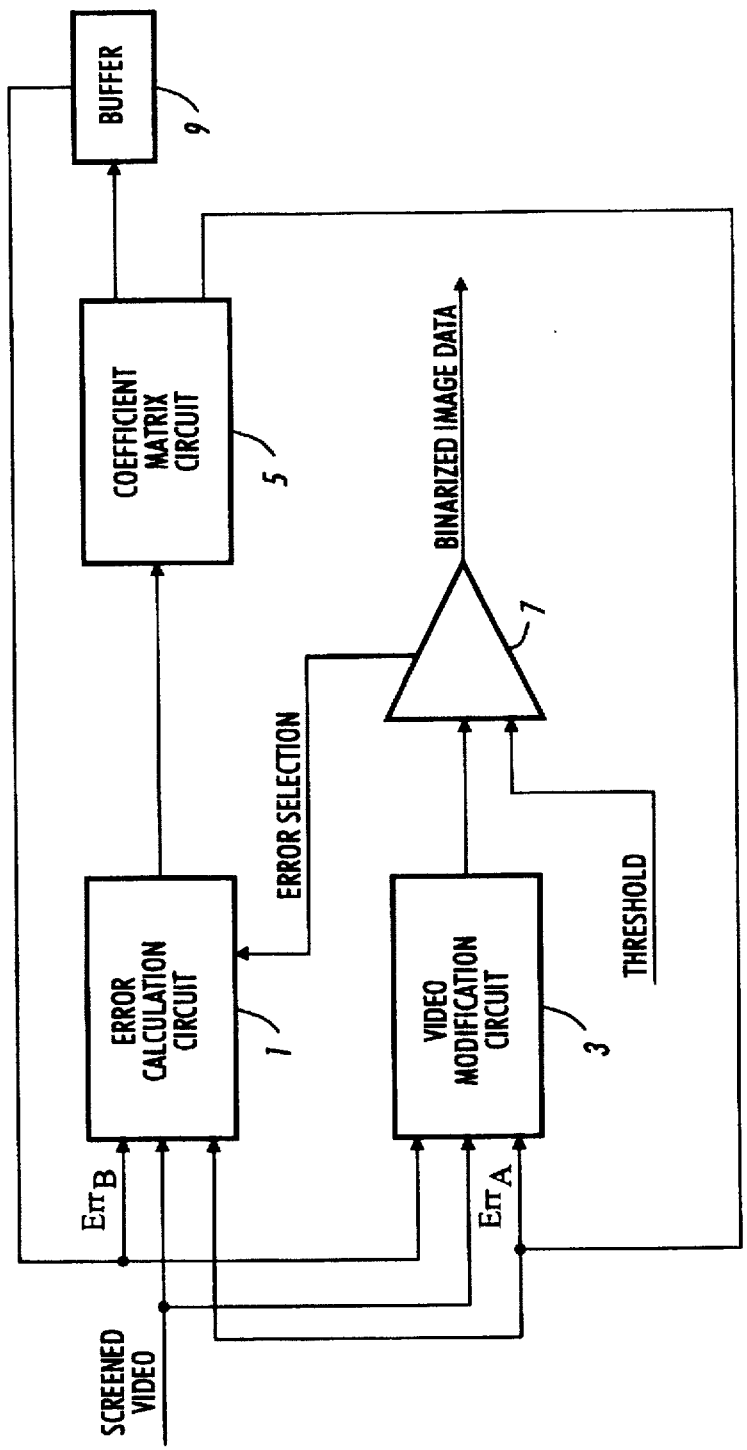
FIG. 20 is a block diagram illustrating implementation of the processes illustrated in FIGS. 11-19.

FIG. 20 illustrates a functional block diagram of the parallel pipeline high addressabillty error diffusion circuit of the preferred embodiment of the present invention. In FIG. 20, the input screened video signal is fed into an error calculation circuit 1 and a video modification circuit 3. The error components $e_{FIFO}$ ($Err_B$) and $e_{FB}$ ($Err_A$) are also fed into the error calculation circuit 1. The error calculation circuit calculates all the various possible error values that can result from the presently occurring binarizaton process. The selection of the proper error to be output by the error calculation circuit 1 is based upon the received error selection signal which will be discussed in more detail below.

The selected error value from the error calculation circuit 1 is fed into a coefficient matrix circuit 5 which distributes the error based upon a set of weighting coefficients. The coefficient matrix circuit 5 splits the error values into the two components $e_{FIFO}$ ($Err_B$) and $e_{FB}$ ($Err_A$). As noted before, the feedback error, $Err_A$, is fed back to the video modification circuit 3 and the error calculation circuit 1 from the coefficient matrix circuit 5. The video modification circuit 3 also receives the $Err_B$ from buffer 9.

The video modification circuit 3 produces the interpolated subpixel values for the high addressability error diffusion method wherein the interpolated subpixel values are fed into the binarization circuit 7 along with a threshold value. In the preferred embodiment of the present invention, the threshold value is 128. However, it is noted that this threshold value can be any value.

The binarization circuit 7 binarizes the inputted video data so as to output binarized image data for the utilization by an image rendering device. The binarization circuit 7 also produces the error selection signal which is utilized by the error calculation circuit 1 to choose the correct error value to be fed to the coefficient matrix circuit 5. This error selection signal represents the number of interpolated subpixels which are turned ON during the binarization process. Thus, the error calculation circuit 1 may include a multiplexer to make this selection.

As illustrated in FIG. 20, the error calculation circuit 1 is in parallel with the video modification circuit and the binarization circuit. Moreover, the high addressability error diffusion architecture of the present invention is implemented on an ASIC, thereby enabling hardware implementation so that the image data can be binarized within the time constraints and throughput specifications of a high speed image rendering device.

Figure 21:
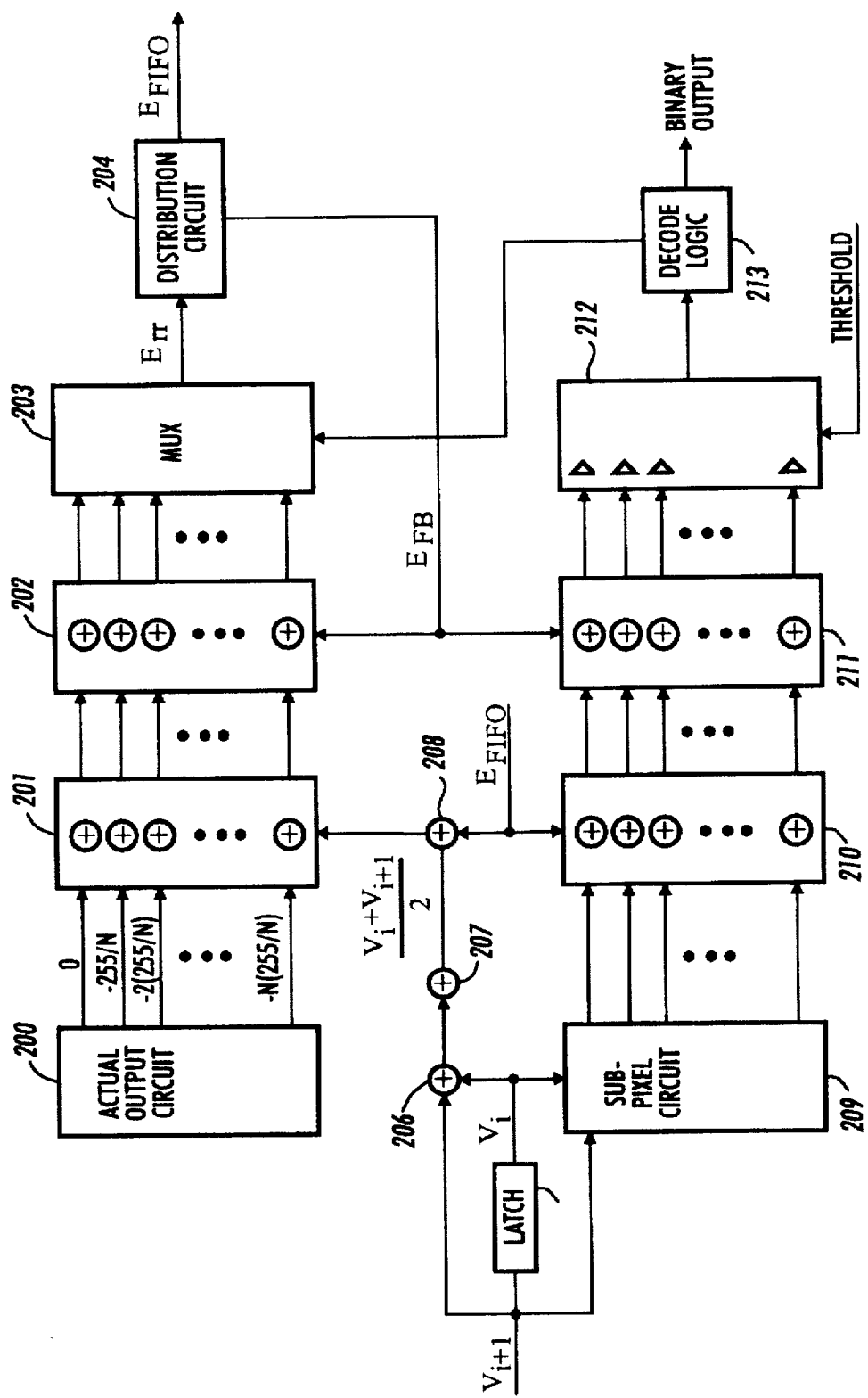
FIG. 21 is a block diagram illustrating circuitry implementation of the processes illustrated in FIGS. 11-19.
Figure 22:
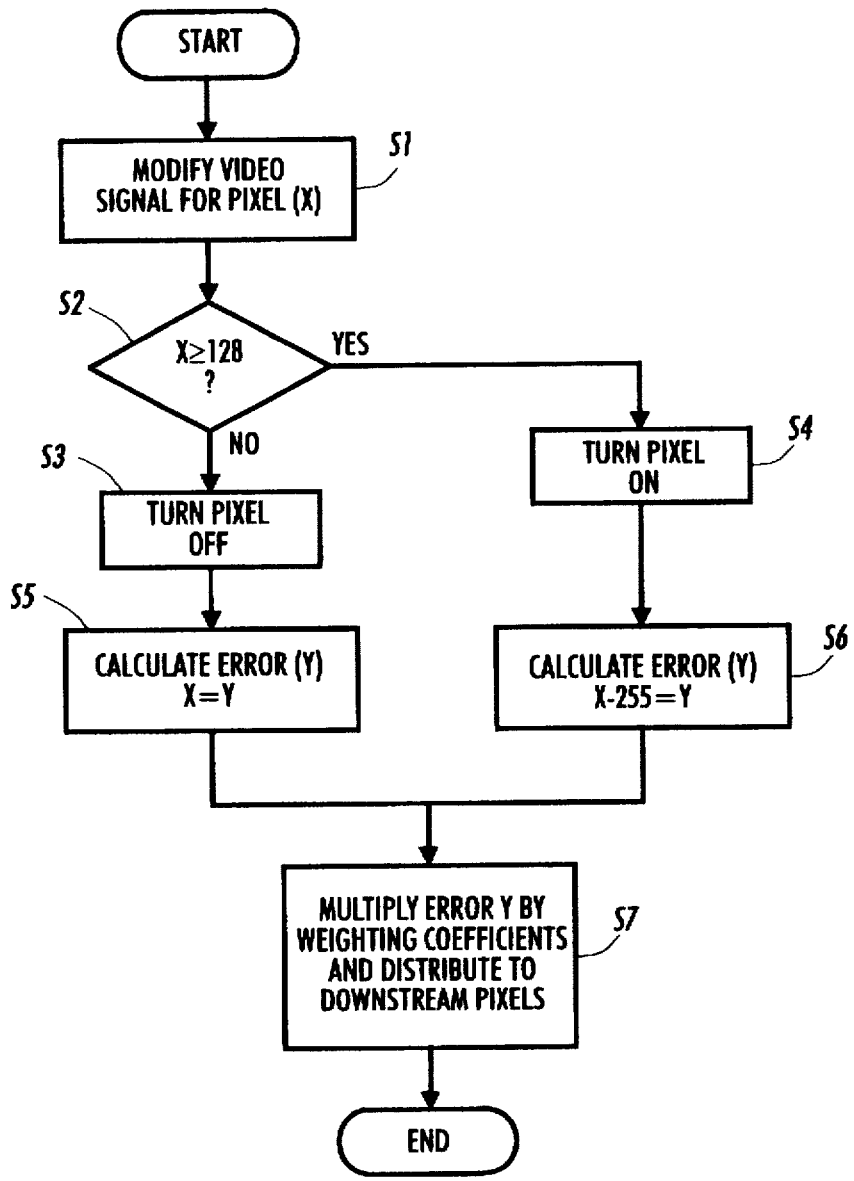
FIG. 22 shows a flowchart illustrating a typical error diffusion method.
Figure 23:
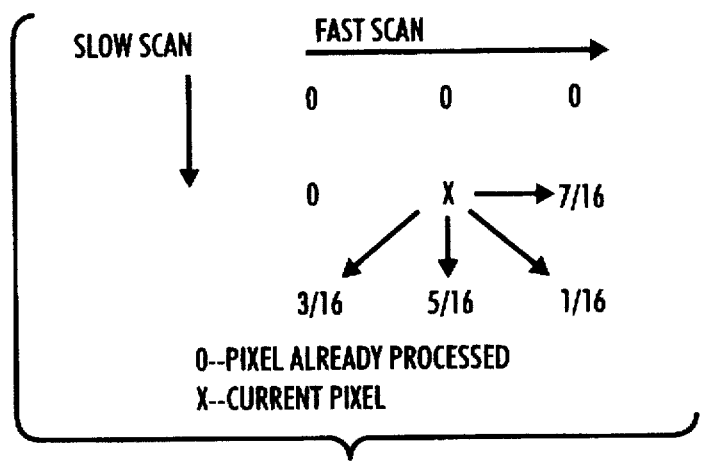
FIG. 23 shows a diagram illustrating a typical weighting coefficient scheme.

FIG. 21 illustrates a detail block diagram of the circuit of the preferred embodiment of the present invention. As illustrated in FIG. 21, many of the computations, as previously described with respect to FIGS. 11–19, are carried out in parallel.

Screened pixel values $V_i$ and $V_{i+1}$ are obtained by the utilization of a latch 205 which latches the screened video signal so that two adjacent fastscan pixels are available for processing. The screened pixel values $V_i$ and $V_{i+1}$ are summed in adder 206 and the sum is divided in half by divider 207. The result from divider 207 is fed into adder 208 with the error term $e_{FIFO}$. The sum represents the desired output to the printer.

In parallel to the above described process, an actual output generation circuit 200 produces all possible outputs to the printer based on the high addressability characteristic. It is noted that these values are negative since an adder is used for subtraction operations. If the high addressability characteristic is N, N possible actual outputs will be generated. Also in parallel to the above described process, a subpixel circuit generated all the interpolated subpixels based on the screened pixel values $V_i$ and $V_{i+1}$.

Next, the error component $e_{FIFO}$ is added to each of the interpolated subpixels by adder 210. At the same time (in parallel thereto), each possible actual outputs (negative values) is individually added to the desired output by adder 201. In other words, N possible actual subpixel outputs are subtracted from the desired output to produce N possible error outputs.

In adders 211 and 202, a feedback error term $e_{FB}$ is added to each summation from adders 210 and 201, respectively. These computations are carried out in parallel. After completing these parallel computations, each interpolated subpixel from adder 211 is compared to a threshold value in threshold circuit 212. The subpixels having a value greater than or equal to the threshold value are turned ON. Threshold circuit outputs a number representing the number of sub pixels turned ON. This information is fed into a decode logic circuit which produces a binary therefrom to be sent to a printer.

Moreover, the error terms from adder 202 are fed into a multiplexer 203 which chooses which error term to propagate to down stream pixels. The error term is selected based on a control signal received from the decode logic circuit 213. The selected error term is fed into a distribution circuit 204 which produces the next feedback error and the error to be stored in a buffer for utilization in the processing of the next scanline.

Figures 39, 40:
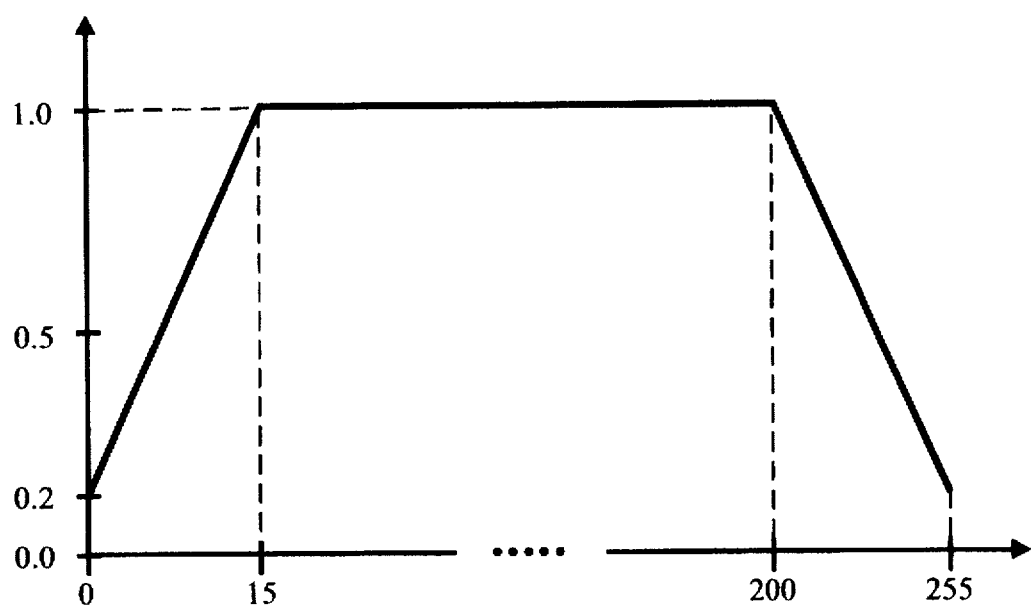
FIG. 39 shows a graphical representation of a preferred dampening profile.
FIG. 40 shows a graphical representation of a matrix of screen values.

The combined screening and high addressability error diffusion rendering of the present invention can be utilized using a simple vertical line screen pattern as illustrated in FIG. 34. Moreover, the present invention can be utilized with a 45° line screen as illustrated in FIG. 35. The present invention can also be utilized with a dot screen as illustrated in FIG. 40 or a constant screen. In the preferred embodiment of the present invention, a dot screen is utilized in a continuous tone region and a constant screen will be used in a text region to emulate a simple error diffusion process. This creates smoother transitions from window-to-window or from effect-to-effect since the error stored in the buffer will be within the same range for both continuous tone and text regions.

In the examples described above, it was assumed that the images were processed with full modulation. One problem encountered when rendering images using full modulation under hybrid processing is border artifacts. A border artifact is observed in areas where a sudden input-grey video transition occurs, such as in black to white or white to black text or line boundary regions. Another distracting caused by using full modulation is called background subpixel phenomena. Background subpixel phenomena is observed in areas where the background region is sprinkled with subpixels. These artifacts usually occur when images are generated using 100% hybrid modulation.

To better explain these artifacts, an image having a white background and a solid black box in it's center will be utilized as an example. If such an image was generated utilizing 100% hybrid modulation, the white background would be sprinkled randomly placed black subpixels. This random scattering of black subpixels in the white background is due to the background subpixel phenomena. Moreover, the edge of the white region would have a uniform pattern of black subpixels which would be caused from the white to black or black to white transition. This uniform pattern of black subpixels would cause a border artifact. Lastly, with respect to the solid black box region within the white background region, the black box image would be randomly sprinkled with white subpixels as a result of the background subpixel phenomena. Moreover, as in the white region, the edge of the black box would contain a uniform pattern of white subpixel forming a border artifact. Thus, the presence of these artifacts reduces the overall quality of the image.

One way to eliminate these artifacts would be to reduce the screen amplitude to a modulation less than 100%. However, it is desirable to have a screen modulation at 100% (when rendering pixels labeled as contone, for example) because the full hybrid dynamic range is used, and thus, a more accurate error is generated and propagated to downstream pixels. Moreover, the benefits of 100% screen modulation with respect to image quality are known and that 100% screen modulation produces smoother regions, especially in the highlight areas.

The reason for the background and border artifacts under full modulation (100% modulation) can best be explained quantitatively. It is noted that under full modulation (100% modulation), the transform hybrid video can come close to or equal to 128 in the white and black regions of a document. Under error diffusion processing, the threshold level is also equal to 128 when utilizing an 8-bit grey scale image processing system. Hence, when any amount of error is added to this video, the resulting pixel value will cross this threshold (128) and produce a subpixel.

To more clearly explain this phenomena, a hypothetical example will be discussed. In thus example, the video value for pixel N will equal 165 ((255–0)+(38–128)+0), [(($G_L-V_i$)

+($S_i$−Th)+Error)], and pixel N+1 will have a video value without the error component of 128 ((255−0) +(1−128)), [(($G_L$−$V_i$)+($S_i$−Th))]. However, by adding a total diffused error component (Error) of −4 to the video value, pixel N+1 drops below the threshold value of 128 thereby creating a white subpixel. In this scenario, the input grey video of both pixel N and pixel N+1 are 0 (black) thus, it would be expected that if the input grey video is representing a solid black region, no white subpixels would be created.

However, the diffused error received from processing previous adjacent pixels may occasionally force a video value below the threshold level, thus generating a white subpixel. This generation of a white subpixel may either cause a border artifact or a background subpixel artifact. Moreover, the affect described above with respect to the generation of a white subpixel when black grey video is received is screen dependent and can become more severe for larger element screens.

To significantly reduce or eliminate the border and background subpixel artifacts, the present invention combines the benefits of zero modulation with 100% modulation by utilizing the hybrid transformation represented by the equation V'=(255−$V_i$)+($S_i$−128)*$Dmp_{vi}$. In this hybrid transformation, $V_i$ is the grey input video, $S_i$ is the screen value, $Dmp_{vi}$ is the dampening factor, and V' is the hybrid video signal resulting from the transformation. By including the dampening factor $Dmp_{vi}$, the amount of modulation can be controlled based upon the value of the input video $V_i$. In other words, the present invention dampens the modulation near the white and black regions by applying full modulation in the midtone regions. An example of this transformation is illustrated in FIG. 41.

Figure 41:
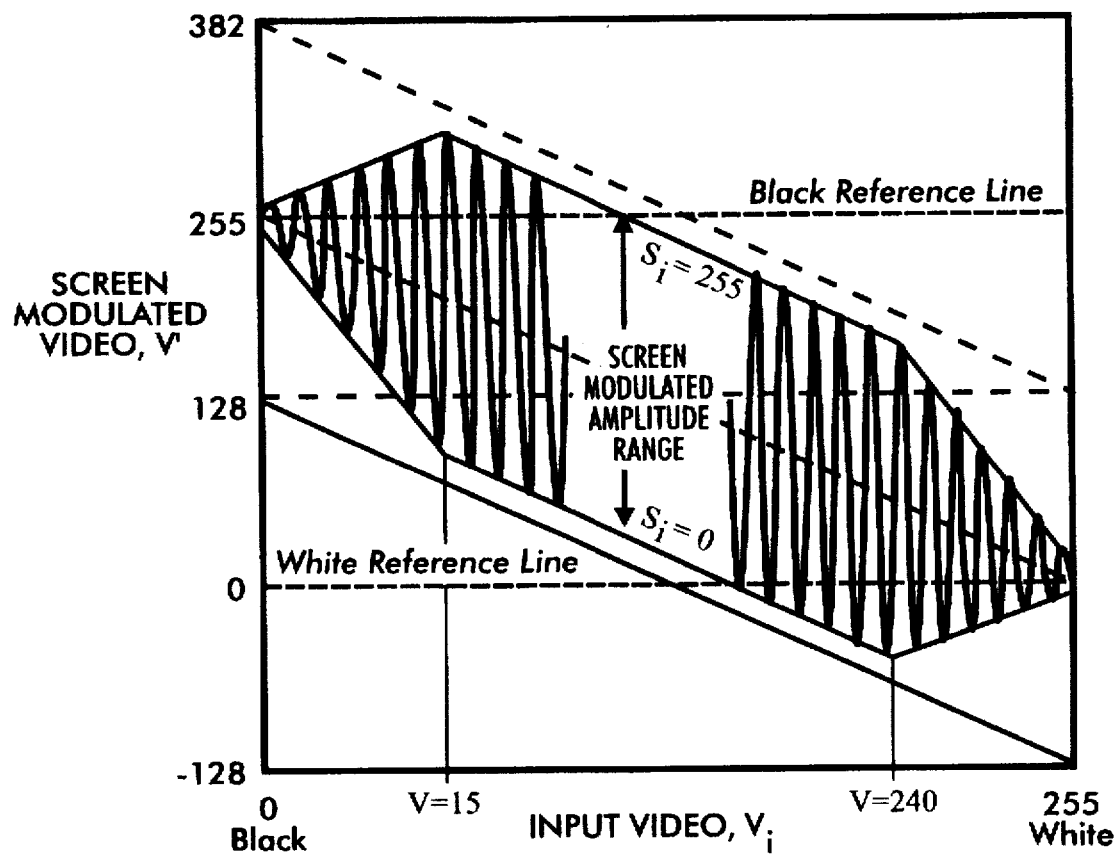
FIG. 41 shows a hybrid video transformation using the damping profile of FIG. 39, the screen of FIG. 40 and a modulation multiplier of 0.80.

As illustrated in FIG. 41, the modulation is dampened between the video values 0 and 15 and 240 and 255 (see dampening profile illustrated in FIG. 39). It is noted that FIG. 41 illustrates an image processing transformation for 8-bit grey scale image data; however, the concepts of this hybrid transformation is readily equable to any magnitude of grey scale level that image data may be processed at. Moreover, FIG. 41 illustrates that full modulation (100% modulation) is applied to a video signal which has values between 15 and 240. By utilizing such a dampening hybrid transformation, the border and background subpixel artifacts are substantially eliminated.

The following is an example of implementing the hybrid dampening transformation illustrated in FIG. 41. More specifically, the video signal is fed into a flip flop whose output is fed into a lookup table which generates the dampening factor $Dmp_{vi}$ based on the value of the input video signal. This dampening factor is fed into another flip flop whose output is fed into a multiplier. In parallel to this process, a screen value associated with the position of the pixel represented by the video is fed into a third flip flop. The output of this flip flop is converted to a value of the screen value minus 128 through the utilization of an inverter. This new value is then fed into a fourth flip flop prior to being fed to the multiplier.

The product from multiplier is fed into a bit shift register so as to produce a value equal to ($S_i$−128)*$Dmp_{vi}$. The dampened screen value is then fed into a fifth flip flop prior to being fed to an adder. At the adder, the dampened screen value is added to a value equal to 255−$V_i$, the video value, so as to produce a hybrid transformed video value of (255−$V_i$)+($S_i$−128)*$Dmp_{vi}$.

In a preferred embodiment of the present invention, the dampening values are programmable wherein the input video is simply used to address a random access memory lookup table wherein the values stored within the lookup table range from 0.0 to 1.0. However, it is further noted, that to conserve memory space, a smaller random access memory lookup table can be utilized wherein this lookup table is programmed only for input grey levels from 0 through 15 and 240 through 255. The dampening value for input grey levels of 16 through 239 would remain at 1.0 (no dampening).

Moreover, in the preferred embodiment of the present invention, the dampening values between 0 and 15 and 240 and 255 represent a linear function from 0% to 100%. In other words, each increment in video value corresponds to an increment of 6.25% in modulation. In the range from 0 to 15 and a decrease of 6.25% in the range of 240 to 255.

Another problem associated with hybrid image processing is the rendering of images at the transition between two distinct segmented regions. Conventionally, to address the problems at these transitional regions, one would switch in a multitude of screens as the rendering process transitions from one distinct segmented region to another distinct segmented region. In order to carry out such a process, the image processing device would require a large amount of memory in order to store all the separate screens need to process the image at the transition region. Not only does the utilization of these various screens require large memory space, the greater number of screens also slows down the image processing operation. This is especially significant when rendering images in a color environment utilizing segmented regions where one screen can easily exceed 2,000 elements To avoid this scenario, the present invention applies certain modulation levels and utilizes the same screen in areas where one segmented region is transitioning to another segmented region. For example, during the transition from a region labeled as text into a region designated as halftone, a screen having a 0% modulation is applied in the text region. Thereafter, prior to encountering the halftone region but within a texticontone border, the present invention slowly increases the modulation level in 20% increments until the modulation level reaches 100% in the halftone region.

As mentioned above, the amount of modulation for screening needs to be controlled for both the elimination of border and subpixel artifacts and to reduce memory space and increase throughput speeds. Although the screen amplitude can also be adjusted by the dampening factor, $Dmp_{vi}$, this video dependent dampening factor is utilized to eliminate the border and background subpixel artifacts which may be present when applying 100% modulation. Thus, as noted above, the screen amplitude must further be adjusted to take into account the transition areas between segmented regions. This further modification can be realized by adding another component which also adjusts the hybrid amplitude modulation. The resulting hybrid transformation is the equation V'=(255−$V_i$)+($S_i$−128)*$Dmp_{vi}$*$Mod_{eff}$ where $Mod_{eff}$ is the modulation multiplication factor based upon effect pointers. The modulation multiplication factor has a value within the range 0.0 to 1.0.

By utilizing this hybrid processing transformation, the present invention can effectively modulate the screening process without switching separate screens. More specifically, the same screen is utilized throughout the transition period, but the modulation multiplication factor is changed in order to realize the proper modulation. In the preferred embodiment of the present invention, the modulation multiplication factor enables the present invention to use up to 17 different modulation multiplication factors ranging from 0.0 to 1.0 in 0.0625 increments. The result of one such modulation process is illustrated in FIG. 41.

As illustrated in FIG. 41, the hybrid video transformation realizes the entire dynamic range of the screening process as represented by the line from 382 to 128 and the line from 128 to −128. In this illustrated example, the dampening profile is that illustrated in FIG. 39 with the screen illustrated in FIG. 40 and a modulation factor, Mod$_{ef}$ of 0.80.

Figure 42:
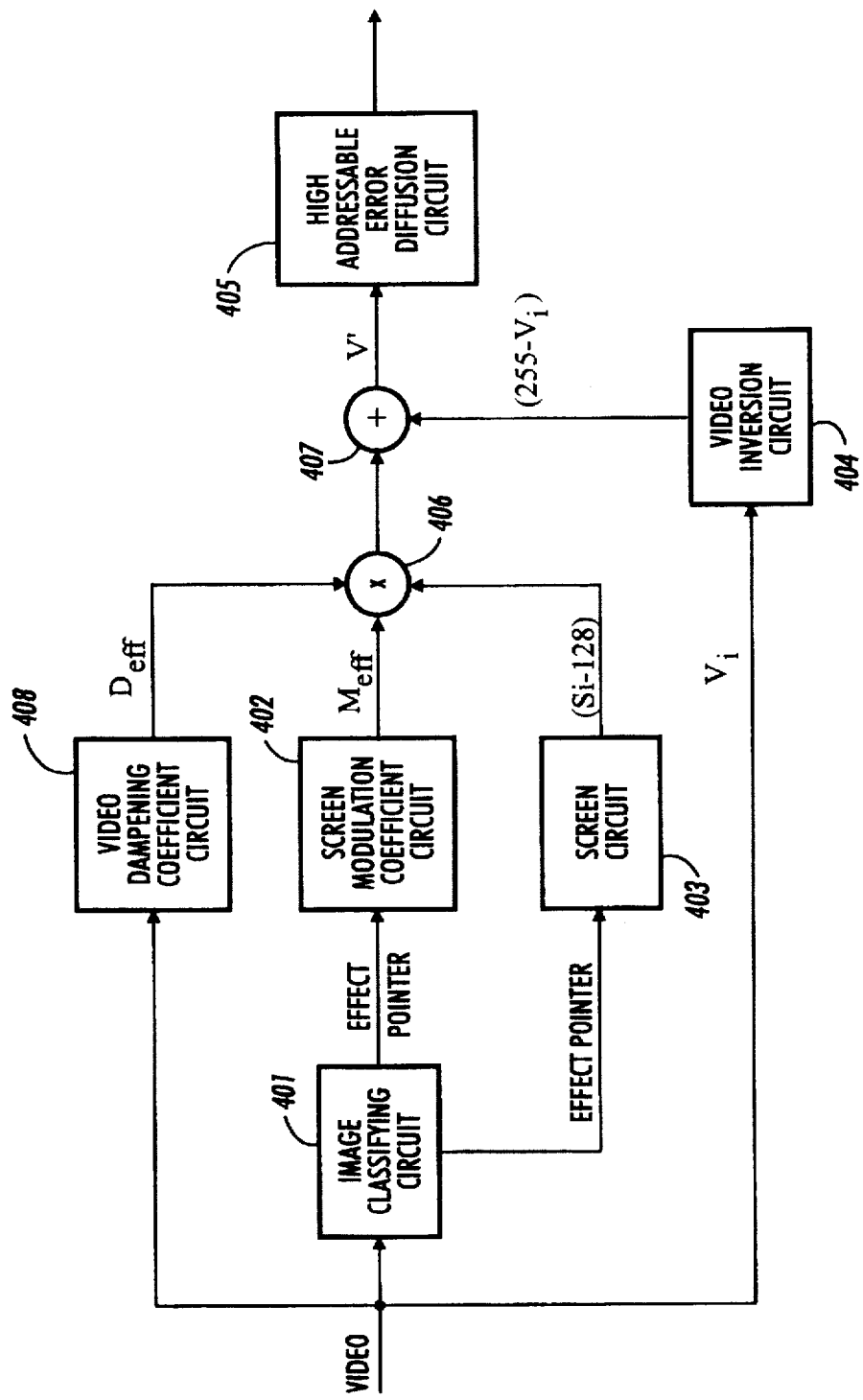
FIG. 42 shows a block diagram illustrating a preferred embodiment of the present invention.

FIG. 42 illustrates a block diagram of one embodiment of hardware implementing the hybrid video transformation process of the present invention that produces the results illustrated in FIG. 41. As illustrated in FIG. 42, the video signal is fed into an image classifying circuit 401 which may be any conventional image segmentation or auto segmentation circuit. The image classifying circuit 401 produces effect pointer which describes the classification of the pixel associated with the video signal. The effect pointer contains information that instructs the downstream image processing modules as to how to process the video data.

The effect pointer information produced by image classifying circuit 401 is fed into a screen modulation coefficient circuit 402 and a screen circuit 403. The screen circuit 403 determines the exact screen to be applied to the image based upon the effect pointer. The screen may be a particular screen for producing a contone image or maybe a constant screen for rendering text or line art image. The exact screen value that is selected from the screen is based on the position of the video (pixel) within the video stream. The output from screen circuit 403 ($S_i$−128) is fed into multiplier 406. In parallel to this process, the screen modulation coefficient circuit 402 determines the modulation multiplication factor M$_{ef}$ based upon the effect pointer value.

In parallel to this process, a video dampening coefficient circuit 408 is generating the dampening value D$_{ef}$. The generation of this value is dependent upon the value of the video signal. In the preferred embodiment, this circuit is a lookup table having the profile illustrated in FIG. 39 stored therein.

The screen value from the screen circuit 403, the modulation multiplication factor M$_{ef}$ from the screen modulation coefficient circuit 402, and the dampening value D$_{ef}$ from video dampening coefficient circuit 408 are fed into multiplier 406 to produce the modified screened signal ($S_i$+Th)*D$_{ef}$*M$_{ef}$ which is then fed into adder 407 to produce the modified screened video signal V$_S$'=(255−V$_i$)+(S$_i$+Th)*D$_{ef}$*M$_{ef}$. The modified screen signal is fed to a high addressable error diffusion circuit 405 for further processing.

By utilizing the above described hybrid method, the present invention is capable of maintaining a high number of grey levels available for printing by the printing system while also utilizing the full dynamic range of the hybrid image processing operations. Thus, the present invention reduces the contouring artifacts typically observed with screens of limited grey level and is able to realize such a feature without affecting the typical image processing architecture of a printing system.

In describing the present invention, the terms pixel and subpixel have been utilized. These terms may refer to an electrical (or optical, if fiber optics are used) signal which represent the physically measurable optical properties at a physically definable area on a receiving medium. The receiving medium can be any tangible document, photoreceptor, or marking material transfer medium. Moreover, the terms pixel and subpixel may refer to an electrical (or optical, if fiber optics are used) signal which represent the physically measurable optical properties at a physically definable area on a display medium A plurality of the physically definable areas for both situations represent the physically measurable optical properties of the entire physical image to be rendered by either a material marking device, electrical or magnetic marking device, or optical display device.

Lastly, the term pixel may refer to an electrical (or optical, if fiber optics are used) signal which represents physical optical property data generated from a single photosensor cell when scanning a physical image so as to convert the physical optical properties of the physical image to an electronic or electrical representation. In other words, in this situation, a pixel is an electrical (or optical) representation of the physical optical properties of a physical image measured at a physically definable area on an optical sensor.

Although the present invention has been described in detail above, various modifications can be implemented without departing from the spirit of the present invention. For example, the preferred embodiment of the present invention has been described with respect to a printing system; however, this screening/error diffusion method is readily implemented in a display system. Moreover, the screening and high addressability error diffusion method of the present invention can be readily implemented on an ASIC, programmable gate array, or in software, thereby enabling the placement of this process in a scanner, electronic subsystem, printer, or display device.

Moreover, various examples of the present invention has been described with respect to a video range of 0 to 255. However, it is contemplated by the present invention that the video range can be any suitable range to describe the grey level of the pixel being processed. Furthermore, the present invention is readily applicable to any rendering system, not necessarily a binary output device. It is contemplated that the concepts of the present invention are readily applicable to a four-level output terminal or higher.

Lastly, the present invention has been described with respect to a monochrome or black/white environment. However, the concepts of the present invention are readily applicable to a color environment. Namely, screening and high addressability error diffusion process of the present invention can be applied to each color space value representing the color pixel.

In recapitulation, the present invention provides a combined screening and error diffusion method or module which enables an image processing system to convert an electronic document of one format to that of another format.

While the present invention has been described with reference to various embodiments disclosed herein before, it is not to be combined to the detail set forth above, but is intended to cover such modifications or changes as made within the scope of the attached claims.

What is claimed is:

1. A method of reducing a number of levels in a multi-level grey scale pixel value representing a pixel and diffusing an error generated from reducing the number of levels, comprising the steps of:

(a) receiving the multi-level grey scale pixel value of a first resolution;

(b) screening the multi-level grey scale pixel value generating a screened multi-level grey scale pixel value equal to ($G_L$−$V_i$)+($S_i$−Th) wherein $G_L$ is the maximum grey level value of the pixel, $V_i$ is equal to the multi-level grey scale pixel value of the first resolution, $S_i$ is equal to a screen value corresponding to a position of the pixel, and Th is the threshold value;

(c) reducing the number of levels in the screened multi-level grey scale pixel value;

(d) generating an error value as a result of the reduction process in said step (c); and (e) diffusing the error value to multi-level grey scale pixel values of adjacent pixels.

2. The method as claimed in claim 1, further comprising the step of:

(f) converting the screened multi-level grey scale pixel value to a second resolution prior to the execution of said step (c), the second resolution being higher than the first resolution;

said step (d) generating an error value having a resolution corresponding to the first resolution.

3. The method as claimed in claim 2, wherein said step (f) comprises the substeps of:

(f1) computing a first multi-level grey scale pixel value; and (f2) computing a second multi-level grey scale pixel value.

4. The method as claimed in claim 3, wherein said step (f) comprises the substep of:

(f3) computing a plurality of multi-level grey scale subpixel values $B_n$, the multi-level grey scale subpixel values $B_n$ being equal to P0+n(P1−P0)/N, wherein n is equal to 0 to N−1, P0 is equal to the first multi-level grey scale pixel value, P1 is equal to the second multi-level grey scale pixel value, and N is equal to a high addressabillty characteristic.

5. The method as claimed in claim 4, wherein said step (b) uses a dot screen to generate the screened multi-level grey scale pixel value.

6. The method as claimed in claim 4, wherein said step (d) comprises the substeps of:

(d1) calculating a desired output, the desired output being equal to a sum of the first and second multi-level grey scale pixel values divided by two;

(d2) calculating an actual output, the actual output being equal to a lowest screen value of a line screen plus a number of subpixels being equal to or greater than a threshold value multiplied by a difference between a maximum screen value of the line screen and the lowest screen value of the line screen divided by a high addressability characteristic; and (d3) calculating the error value to be equal to the desired output minus the actual output.

7. A system for reducing a number of levels in a multi-level grey scale pixel value representing a pixel and diffusing an error generated from reducing the number of levels, comprising;

input means for receiving the multi-level grey scale pixel value, the multi-level grey scale pixel value;

screening means for generating a screened multi-level grey scale pixel value equal to $(G_L-V_i)+(S_i-Th)$ wherein $G_L$ is the maximum grey level value of the pixel, $V_i$ is equal to the multi-level grey scale pixel value of the first resolution, $S_i$ is equal to a screen value corresponding to a position of the pixel, and Th is the threshold value;

means for reducing the number of levels in the screened multi-level grey scale pixel value;

error means for generating an error value as a result of the reduction by said means; and error diffusing means for diffusing the error value to multi-level grey scale pixel values of adjacent pixels.

8. The system as claimed in claim 7, further comprising: high addressability means for converting the screened multi-level grey scale pixel value to a second resolution, the second resolution being higher than the first resolution;

said error means generating an error value having a resolution corresponding to the first resolution.

9. The system as claimed in claim 8, wherein said high addressability means computes a first and second multi-level grey scale pixel value.

10. The system as claimed in claim 9, wherein said high addressability means further computes a plurality of multi-level grey scale subpixel values $B_n$, the multi-level grey scale subpixel values $B_n$ being equal to P0+n(P1−P0)/N, wherein N is equal to 0 to N−1, P0 is equal to the fist multi-level grey scale pixel value, P1 is equal to the second multi-level grey scale pixel value, and N is equal to a high addressability characteristic.

11. The system as claimed in claim 10, wherein said screening means uses a dot screen to generate the screened multi-level grey scale pixel value.

12. The system as claimed in claim 10, wherein said error means comprises:

first means for calculating a desired output, the desired output being equal to a sum of the first and second multi-level grey scale pixel values divided by two;

second means for calculating an actual output, the actual output being equal to a lowest screen value of a line screen plus a number of subpixels being equal to or greater than a threshold value multiplied by a difference between a maximum screen value of the line screen and the lowest screen value of the line screen divided by a high addressability characteristic; and third means for calculating the error value to be equal to the desired output minus the actual output.

13. A method of generating an error value, comprising the steps of:

(a) generating a screened multi-level grey scale pixel value representing a pixel having a first resolution equal to $(G_L-V_i)+(S_i-Th)$ wherein $G_L$ is the maximum grey level value of the pixel, $V_i$ is equal to the multi-level grey scale pixel value of the first resolution, $S_i$ is equal to a screen value corresponding to a position of the pixel, and Th is the threshold value;

(b) converting the screened multi-level grey scale pixel value to a second resolution, the second resolution being higher than the first resolution;

(c) thresholding the screened multi-level grey scale pixel value representing the pixel having the second resolution; and (d) generating the error value as a result of thresholding the screened multi-level grey scale pixel value in said step (c), the error value having the first resolution.

14. The method as claimed in claim 13, further comprising the step of:

(e) diffusing the error value to multi-level grey scale pixel values of pixels adjacent to the pixel being thresholded.

15. A printing system for rendering marks on a recording medium, comprising:

receiving means for receiving a multi-level grey scale pixel value representing a pixel having a first resolution;

screening means for generating a screened multi-level grey scale pixel value equal to $(G_L-V_i)+(S_i-Th)$ wherein $G_L$ is the maximum grey level value of the pixel, $V_i$ is equal to the multi-level grey scale pixel value of the first resolution, $S_i$ is equal to a screen value corresponding to a position of the pixel, and Th is the threshold value;

interpolation means for converting the screened multi-level grey scale pixel value to a second resolution, the second resolution being higher than the first resolution;

binarization means for binarizing the converted multi-level grey scale pixel value so as to output a binary signal and an error value, the error value having a resolution equal to the first resolution;

diffusing means for diffusing the error value to multi-level grey scale pixel values corresponding to pixels adjacent to the pixel having the first resolution; and rendering means for converting the binary signal into a mark on the recording medium.

16. A system for screening a multi-level grey scale pixel value, comprising:

receiving means for receiving a multi-level grey scale pixel value representing a pixel having a first resolution;

screening means for generating a screened multi-level grey scale pixel value equal to $(G_L-V_i)+(S_i-Th)$ wherein $G_L$ is the maximum grey level value of the pixel, $V_i$ is equal to the multi-level grey scale pixel value of the first resolution, $S_i$ is equal to a screen value corresponding to a position of the pixel, and Th is the threshold value;

interpolation means for converting the screened multi-level grey scale pixel value to a second resolution, the second resolution being higher than the first resolution; and binarization means for binarizing the converted multi-level grey scale pixel value so as to output a binary signal and an error value, the error value having a resolution equal to the first resolution.

17. The system as claimed in claim 16, further comprising:

diffusing means for diffusing the error value to multi-level grey scale pixel values corresponding to pixels adjacent to the pixel having the first resolution.

\* \* \* \* \*